Figure 3B:
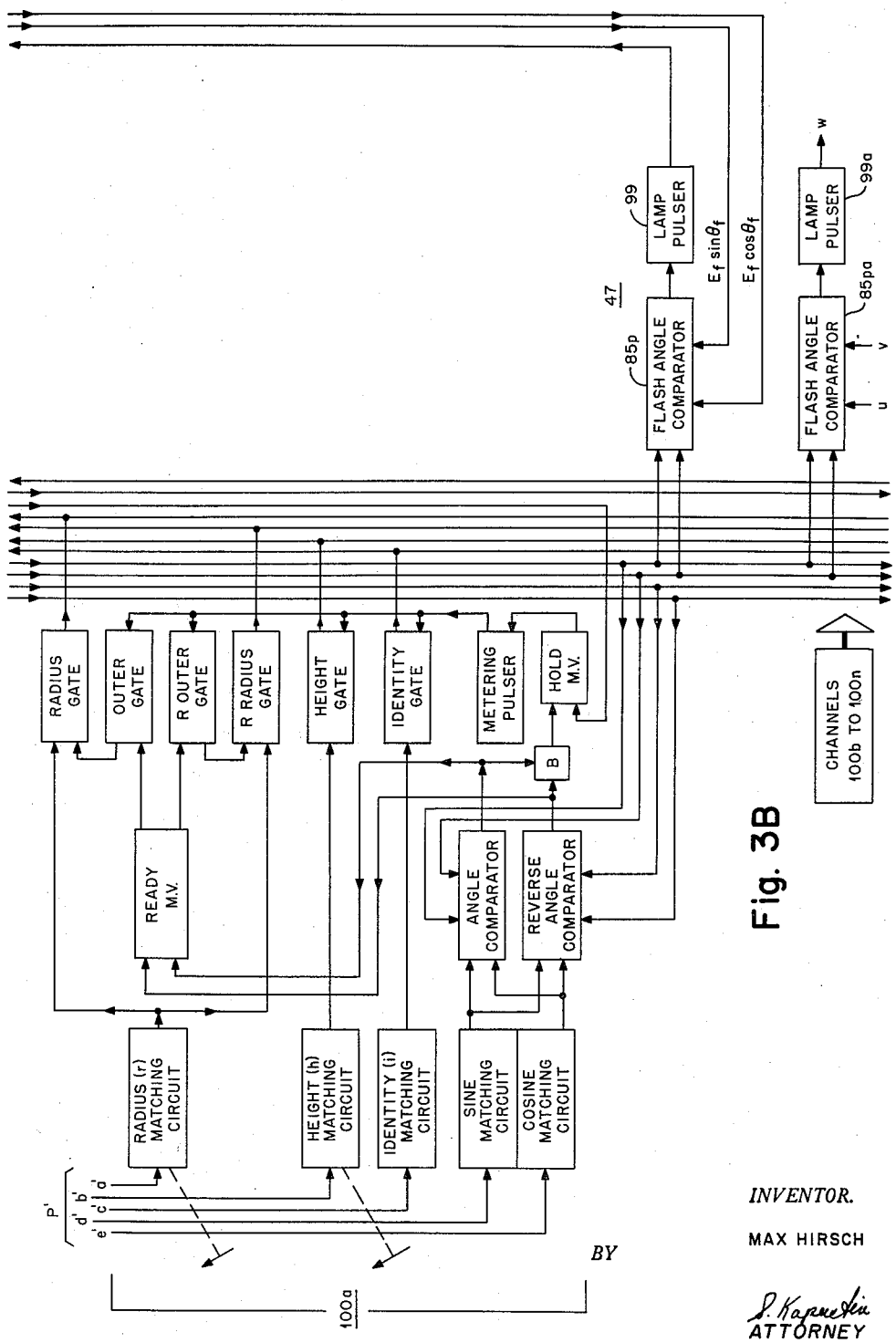

Jan. 10, 1961           M. HIRSCH           2,967,905
THREE DIMENSIONAL DISPLAY APPARATUS
Filed Jan. 13, 1958           12 Sheets-Sheet 1
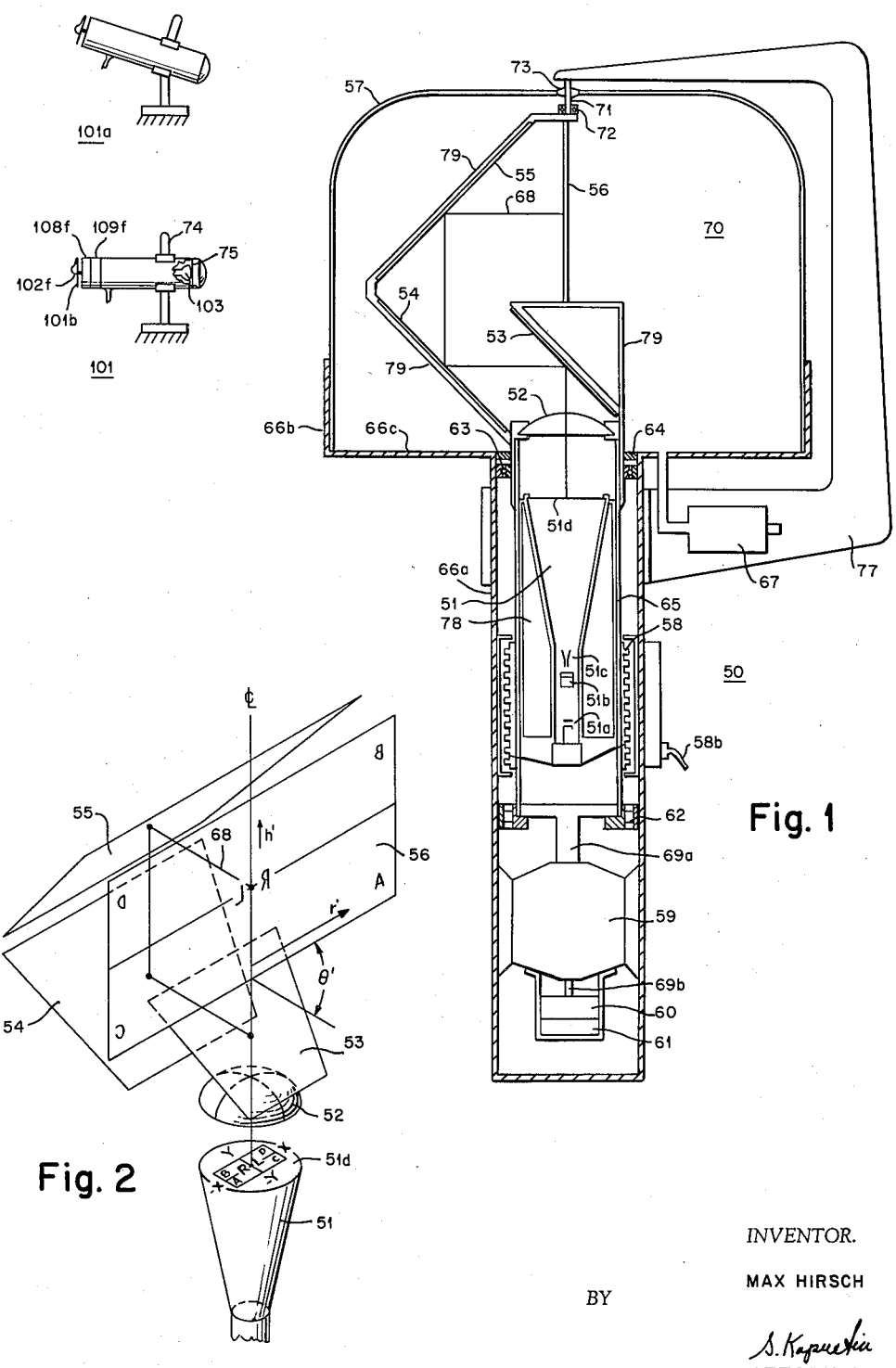
INVENTOR.
MAX HIRSCH
BY
*S. Kapustka*
ATTORNEY

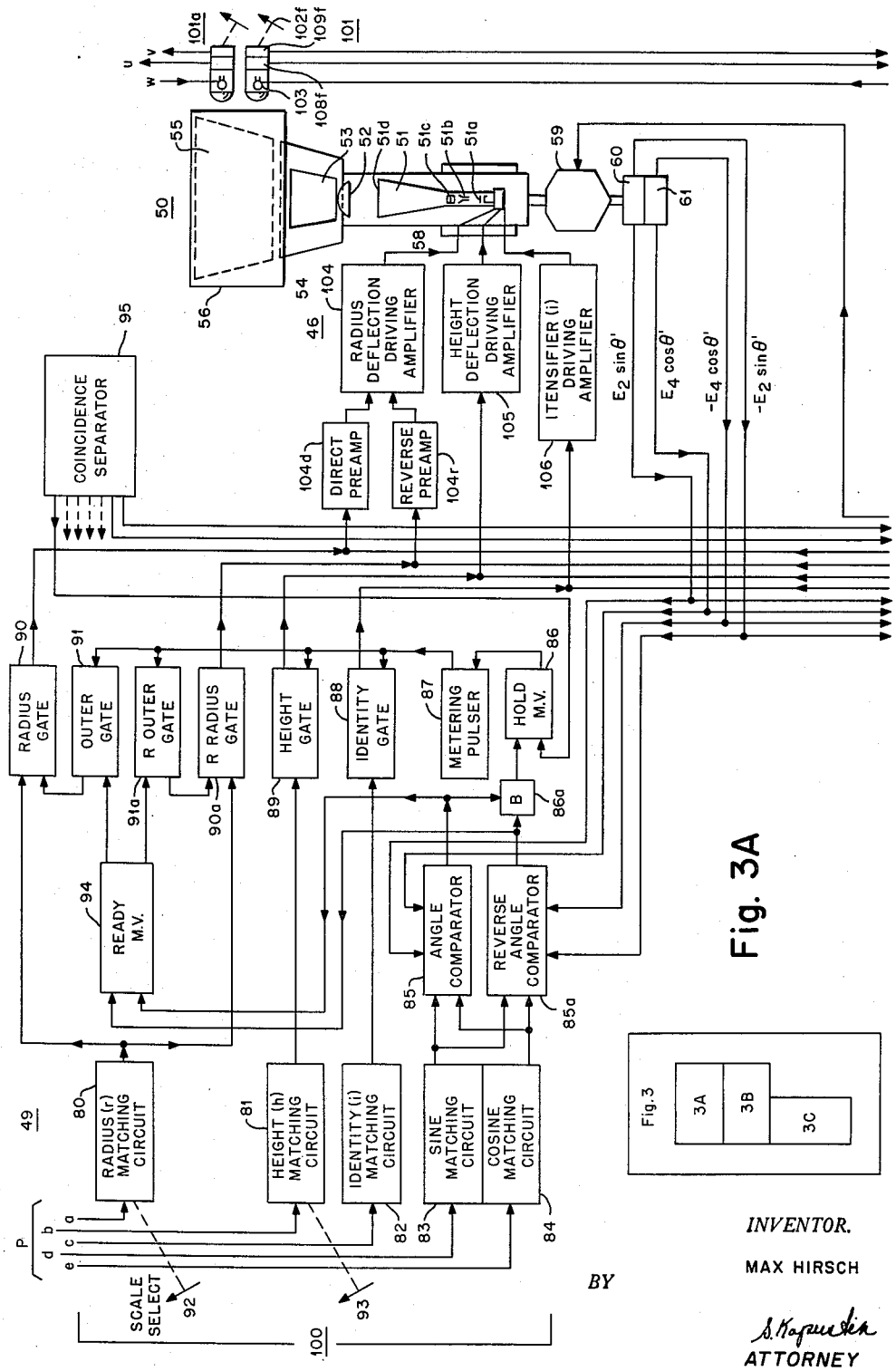
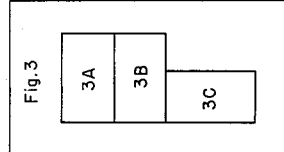
Fig. 3A
INVENTOR.
MAX HIRSCH
ATTORNEY

Jan. 10, 1961 M. HIRSCH 2,967,905
THREE DIMENSIONAL DISPLAY APPARATUS
Filed Jan. 13, 1958 12 Sheets-Sheet 3

INVENTOR.
MAX HIRSCH
BY
*S. Kapnekia*
ATTORNEY

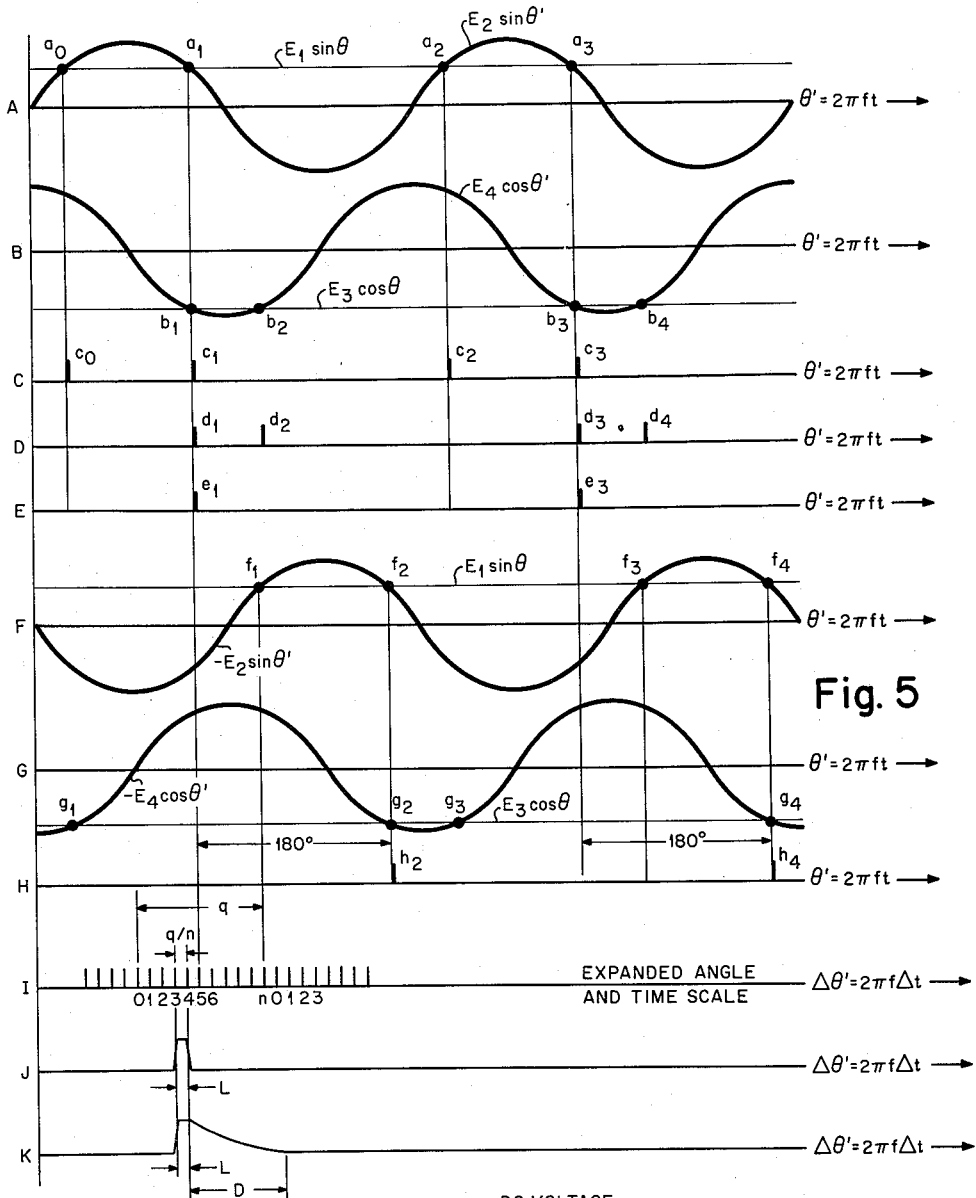
Fig. 5
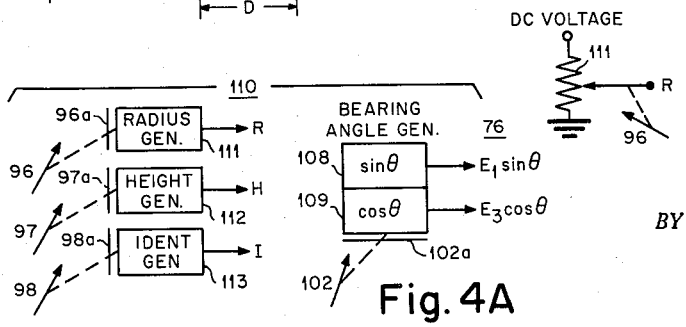
Fig. 4A
Fig. 4B
INVENTOR.
MAX HIRSCH
BY
J. Kapusta
ATTORNEY Jan. 10, 1961  M. HIRSCH  2,967,905
THREE DIMENSIONAL DISPLAY APPARATUS
Filed Jan. 13, 1958
12 Sheets-Sheet 6
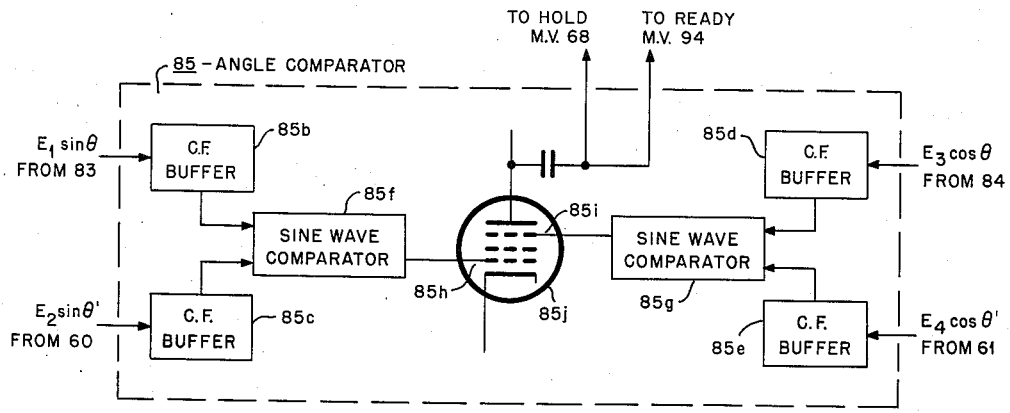
Fig. 6A
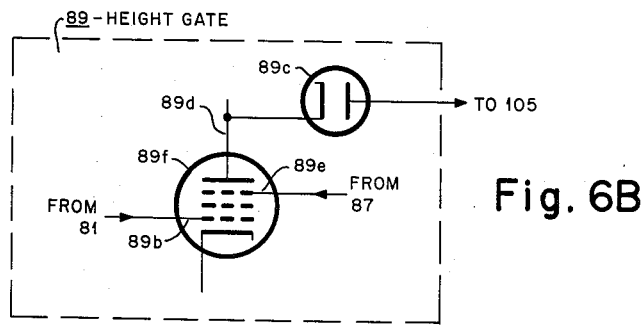
Fig. 6B
Fig. 6D
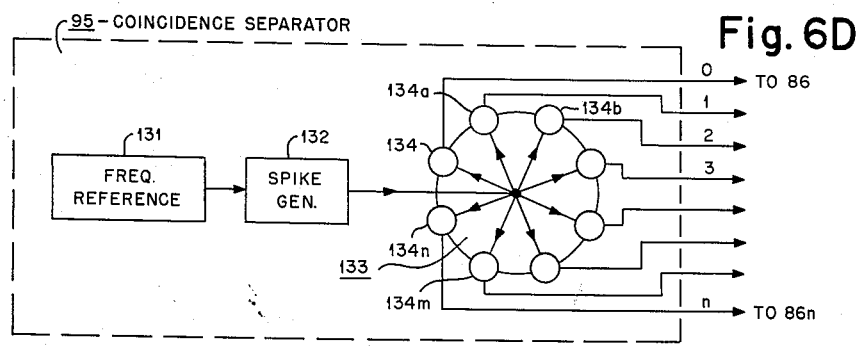
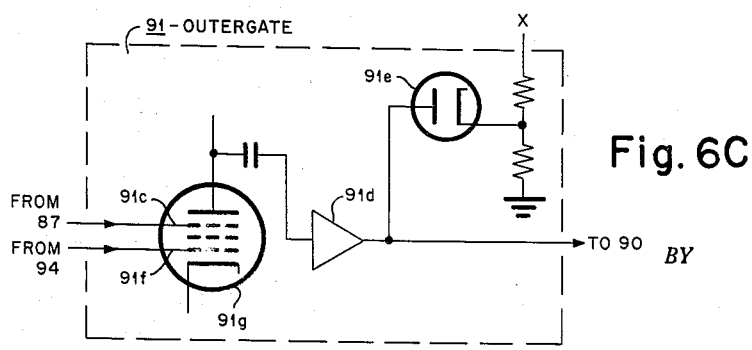
Fig. 6C
*INVENTOR.*
MAX HIRSCH
*ATTORNEY*

Jan. 10, 1961 M. HIRSCH 2,967,905
THREE DIMENSIONAL DISPLAY APPARATUS
Filed Jan. 13, 1958 12 Sheets-Sheet 7
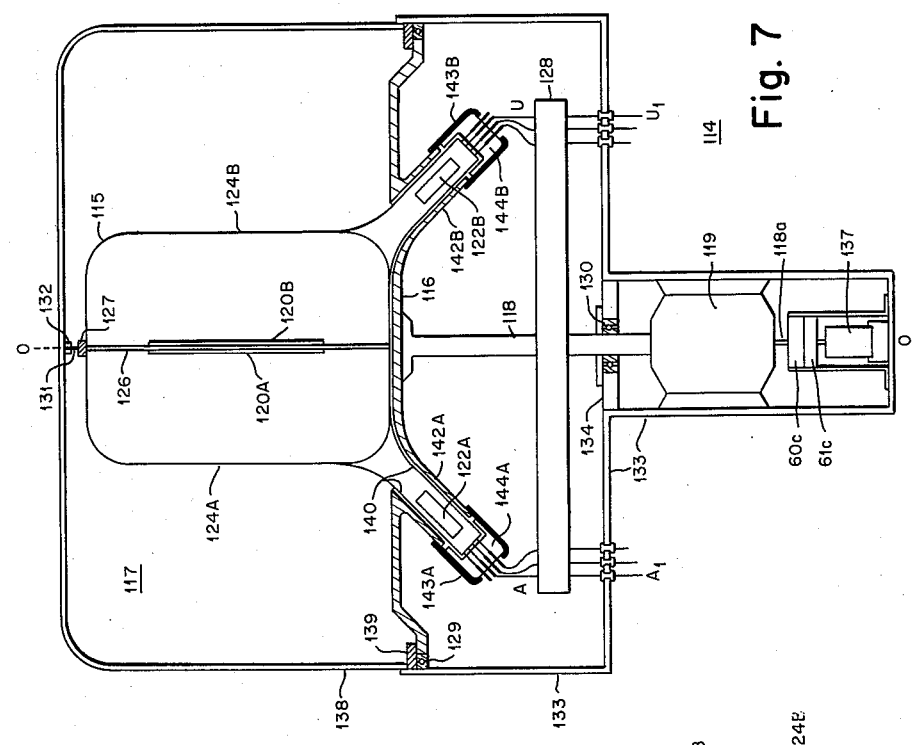
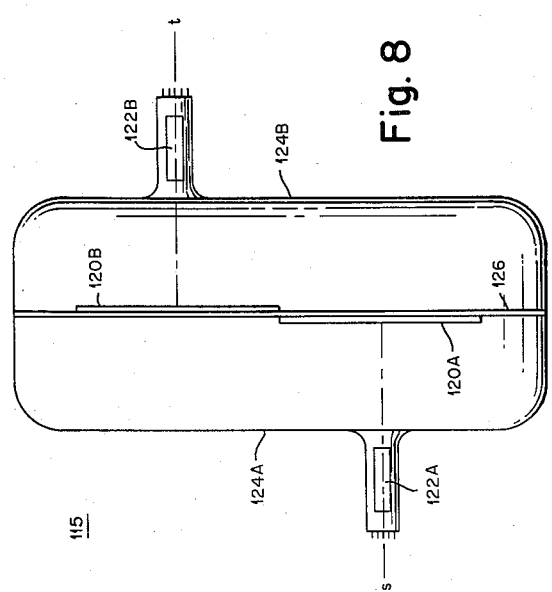
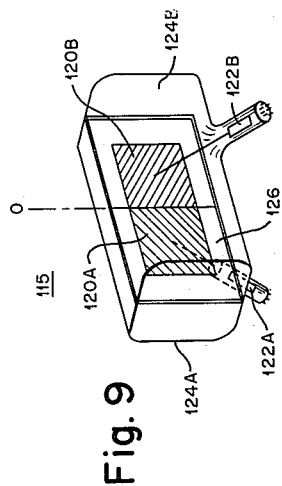
INVENTOR.
MAX HIRSCH
BY
*S. Kapusta*
ATTORNEY

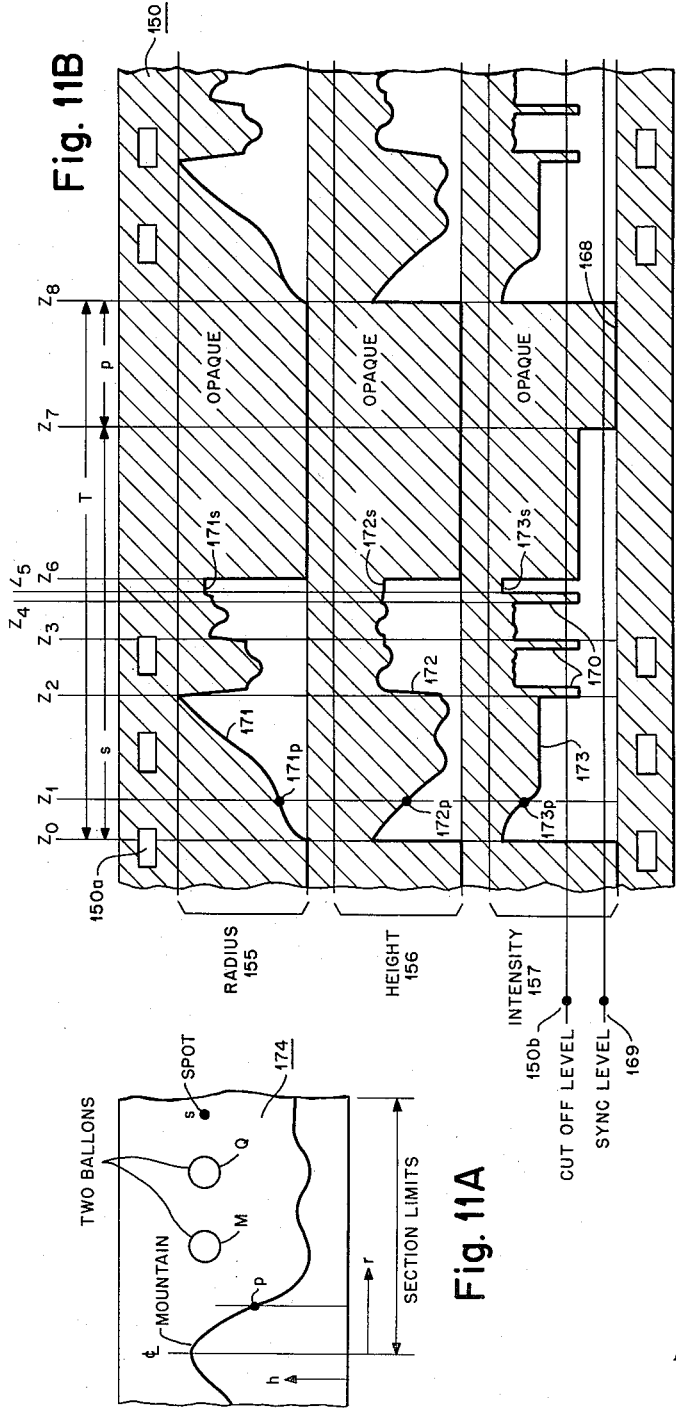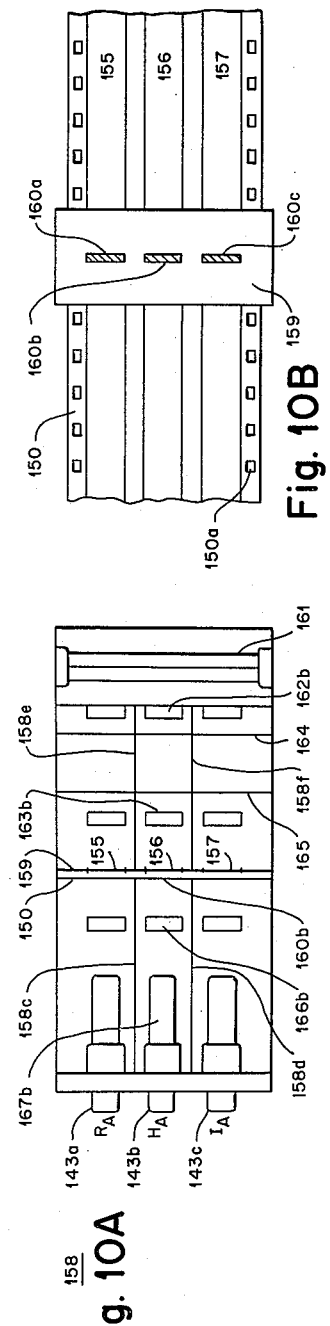

Jan. 10, 1961  M. HIRSCH  2,967,905
THREE DIMENSIONAL DISPLAY APPARATUS
Filed Jan. 13, 1958  12 Sheets-Sheet 9

*INVENTOR.*
MAX HIRSCH
BY
*ATTORNEY*

INVENTOR.
MAX HIRSCH

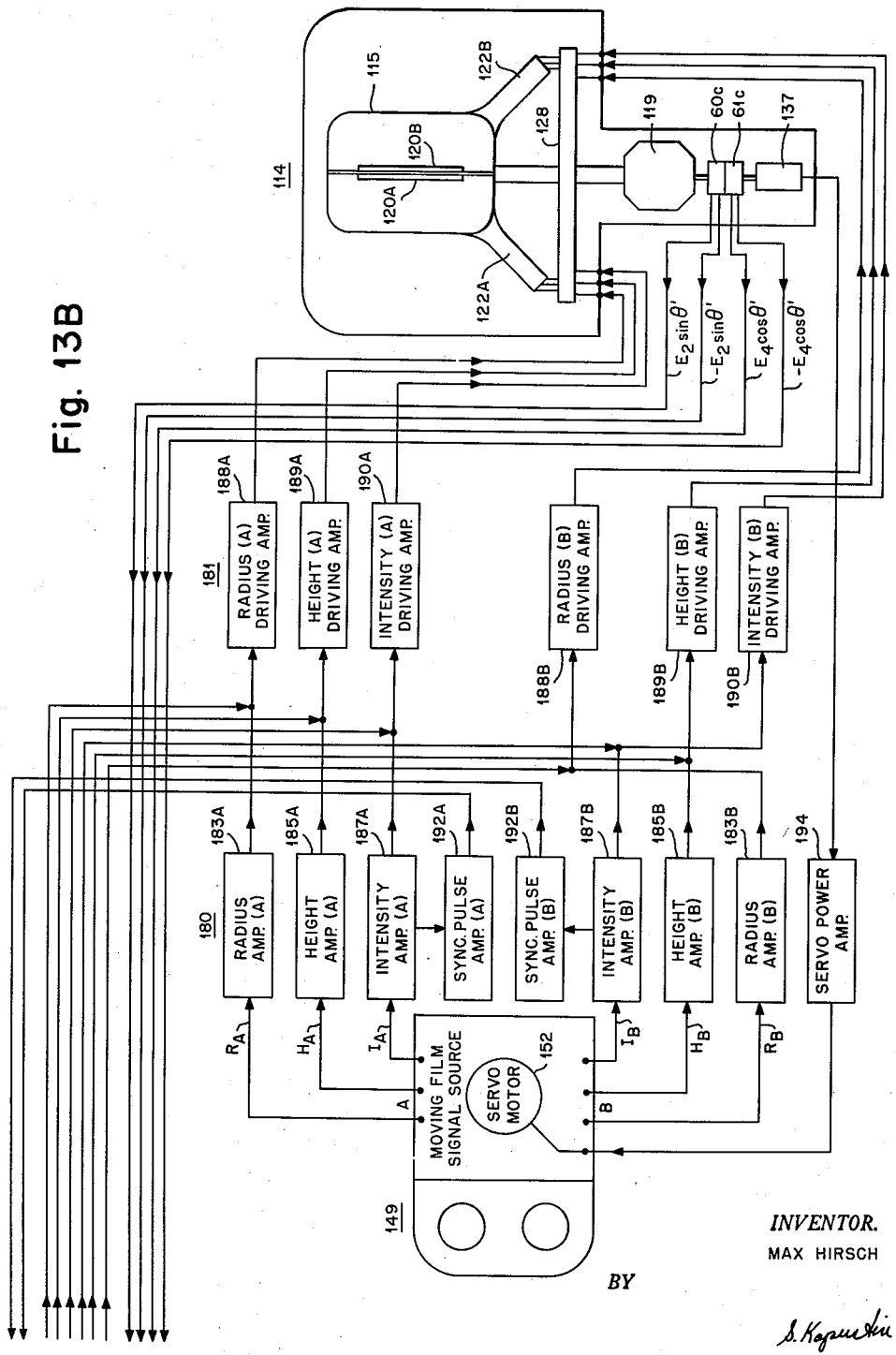

Jan. 10, 1961

M. HIRSCH 2,967,905

THREE DIMENSIONAL DISPLAY APPARATUS

Filed Jan. 13, 1958

12 Sheets-Sheet 12

INVENTOR.
MAX HIRSCH
BY
*S. Kapustin*
ATTORNEY

United States Patent Office 2,967,905
Patented Jan. 10, 1961

2,967,905

THREE DIMENSIONAL DISPLAY APPARATUS

Max Hirsch, 4810 N. 11th St., Philadelphia 41, Pa.

Filed Jan. 13, 1958, Ser. No. 708,474

62 Claims. (Cl. 178—6.5)

This invention relates to a means for presenting images that are reproductions in three dimensions of scenes, solid objects, surfaces, lines and/or arrays of points in space. More particularly, this invention relates in part to a means for presenting, in rapid succession, a series of images which are sections of a solid object or volume on a rotating surface or surfaces to thereby present to an observer a three dimensional image of the entire object or volume. This invention also relates to the display of images of continuous linear patterns in three dimensions.

The representation of scenes by models, solid objects by sculpture, of surfaces by semi-relief scuplture, and of line patterns and arrays of points in space by mechanical models has long been known. The art of forming two-dimensional images by photographic and electronic techniques has been well developed and this art has been extended to give the perception of a third dimension by the methods of stereoscopy. Attempts have been made to generate true three dimensional images, for example, as taught in the Ferril Patent No. 2,361,390, and the Marks Patent No. 2,543,793, whereby sections of a solid image are displayed on a screen. These patents disclosed apparatus for displaying an image on a screen (or screen elements) which was cyclically moved with effective linear displacement.

This invention, employs the principle of forming and displaying a sequence of two dimensional images of sections of a solid on a screen which is rotated to sweep out a volume at such a rapid rate that the persistence of vision gives the perception of sustained solid or three dimensional images that may have color and motion. Furthermore, in the preferred embodiment of this invention, the screen is substantially parallel to the axis of its rotation. The advantages of this arrangement are that the screen may be of such form that convenient sections (e.g., diametrical sections) of the solid can be displayed thereupon, large volumes can be swept out, and the forces caused by the rotary motion of the screen can be made constant. Another important aspect of this invention, not found in prior art is that new and superior means are provided for good definition of the displayed solid image compatible with a short time available for the display of sequential sections of the image comprising the entire solid. A device for displaying three dimensional views of solids or volumes is herein called a generescope since the displacement of a series of two dimensional images generates solid or three dimensional images.

The apparatus to be described herein for displaying three dimensional images employs a two dimensional image forming means that in the preferred embodiment of this invention is a cathode ray tube. The images formed are projected onto a display screen that is rotated so as to display a three dimensional solid image in a volume.

In order that the three dimensional images appear sustained, the frequency of screen rotation, upon which the two dimensional images are cast, must be over twenty cycles per second, or the period of a single cycle of rotation may be about 1/25 of a second. If the number of two dimensional images displayed in each cycle of screen rotation is of the order of several hundred, e.g. 300, the time available for the display of each two dimensional image is very short, e.g. 1/7500 second. This short time is still further reduced if some of the elemental areas of the two dimensional image are displayed in temporal sequence. The several features which make good definition compatible with the short display time available are a part of this invention.

The information for the three dimensional images may originate in many ways, i.e., in sensing means as radars, direction finders and generating means such as electronic computers, and electrical function generators; but in any case, the data signal must be synchronous or made synchronous with the screen movement. Synchronizable repetitive data signal sources are by a feature of this invention made synchronous with the screen movement; for non-synchronizable repetitive data signal sources the screen movement is synchronized with the data signals. Other data sources do not allow such simple accommodation, for these, the data may be storade by a variety of means and then "played back" synchronously with the screen movement. The storage means may be analog in nature, i.e., the voltage on a condenser, the setting of a potentiometer, the physical direction of a projector, etc.

By using time sharing techniques and multiple projectors information of different content and from different sources may be displayed within a single three dimensional image to give an effect similar to superimposing in photography.

The objects of this invention are many and those mentioned may be considered a typical category. One object of this invention is to provide a true three dimensional indicator for the unambiguous mapping of discrete points in a volume. Such a device would have great utility in problems relating to air traffic control since the positions and movements in three dimensions of the air borne elements would be viewable to a group of observers.

Another object is to provide means for training personnel in air traffic control.

Another object of this invention is to provide means for displaying a three dimensional presentation of various line patterns to give the use of a three dimensional oscilloscope.

Another object of this invention is to provide a three dimensional display for the output of computers.

Still another object, is to provide means for simultaneously presenting a three dimensional view of a given terrain along with a view of objects which may enter and move within the atmosphere surrounding the terrain.

Another object is to provide means for displaying a three dimensional image of a volume along with means for calling attention to any given portion of the displayed volume.

A further object is to provide a three dimensional display of a given scene along with co-ordinates identifying the sections of the scene.

Another objective of this invention is to provide means for presenting three dimensional images of sufficient size to be seen by large groups of observers.

An objective of this invention is to provide means for greatly improving the resolution of three dimensional images generated by screens employing cyclic motion.

An objective of this invention is to provide means for the display of three dimensional images by non-scanning deflection signals of low bandwidths.

The basic objective of this invention is to provide a fundamental means for presenting three dimensional images that are viewable from a large solid angle.

The specific descriptions of embodiments of this invention illustrate the principle on which it is founded more fully, and suggests other objects and uses. It is to be expressly understood, however, that the embodiments of the invention disclosed herein are meant to be illustrative only of mechanisms employing the principles of the invention and serve as a teaching of any equivalent elements that could be used in the described structures.

Referring to the drawings, which form a part of this description, there is shown in—

Fig. 1 a cross-sectional view of a cathode ray tube-optical projection, rotary type, three dimensional display assembly (generescope) and associated flash lamp projectors.

Fig. 2 an isometric view of the optical system of the cathode ray tube-optical projection, rotary type, three dimensional display assembly.

Figure 3C:
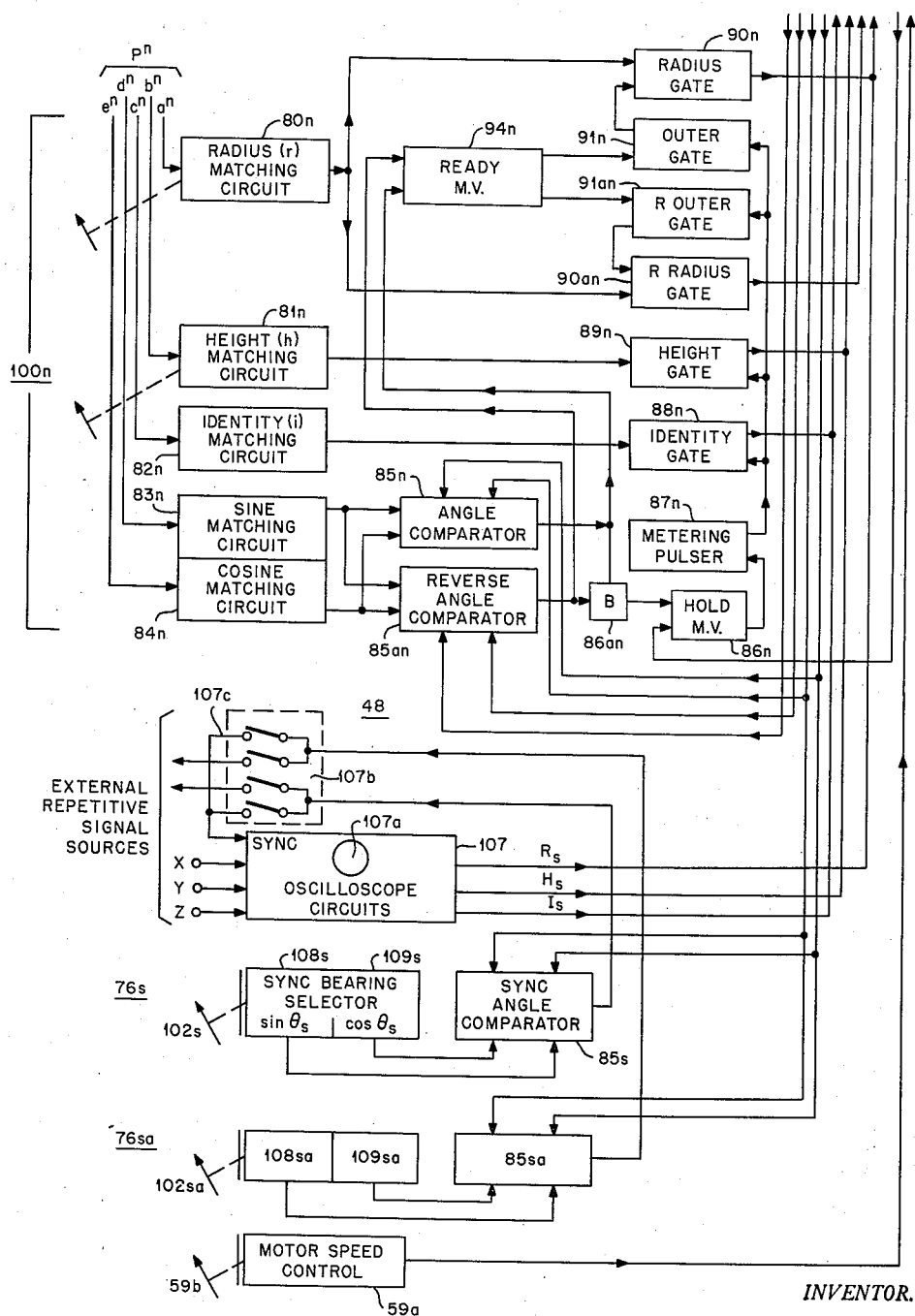

Figs. 3A to 3C a block diagram of circuits used in conjunction with the apparatus of Fig. 1. (Fig. 3 illustrates the proper arrangement for Figs. 3A to 3C.)

Fig. 4A a set of potentiometers for generating data signals corresponding to the attributes of a displayed spot of light.

Fig. 4B a basic diagram of radius generator.

Fig. 5 wave forms associated with circuits of block diagram of Fig. 3.

Fig. 6A basic diagram of an angle comparator.

Fig. 6B basic diagram of a height gate.

Fig. 6C basic diagram of an outer gate.

Fig. 6D basic diagram of a coincidence separator.

Fig. 7 sectional view of the direct view-dual-cathode ray tube rotary type three dimensional display assembly (generescope).

Fig. 8 top view of direct view cathode ray tube.

Fig. 9 perspective view of direct view cathode ray tube.

Fig. 10A top view of an optical transducer.

Fig. 10B front view of mask of the optical transducer.

Fig. 11A sectional view of unified scene of terrain and airborne objects.

Fig. 11B three channel variable area photographic film record corresponding to sectional view of Fig. 11A.

Figure 12:
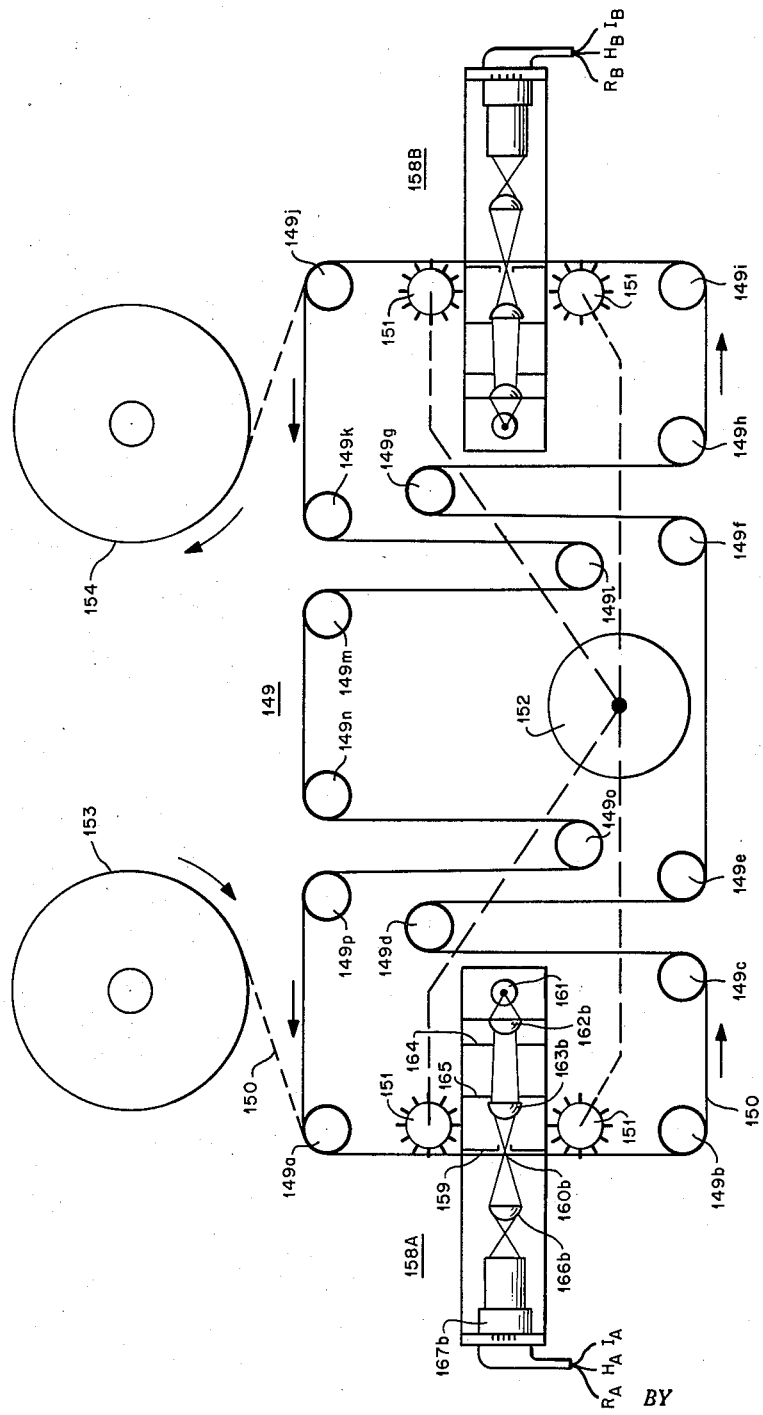

Fig. 12 moving film record-signal producer.

Figure 13A:
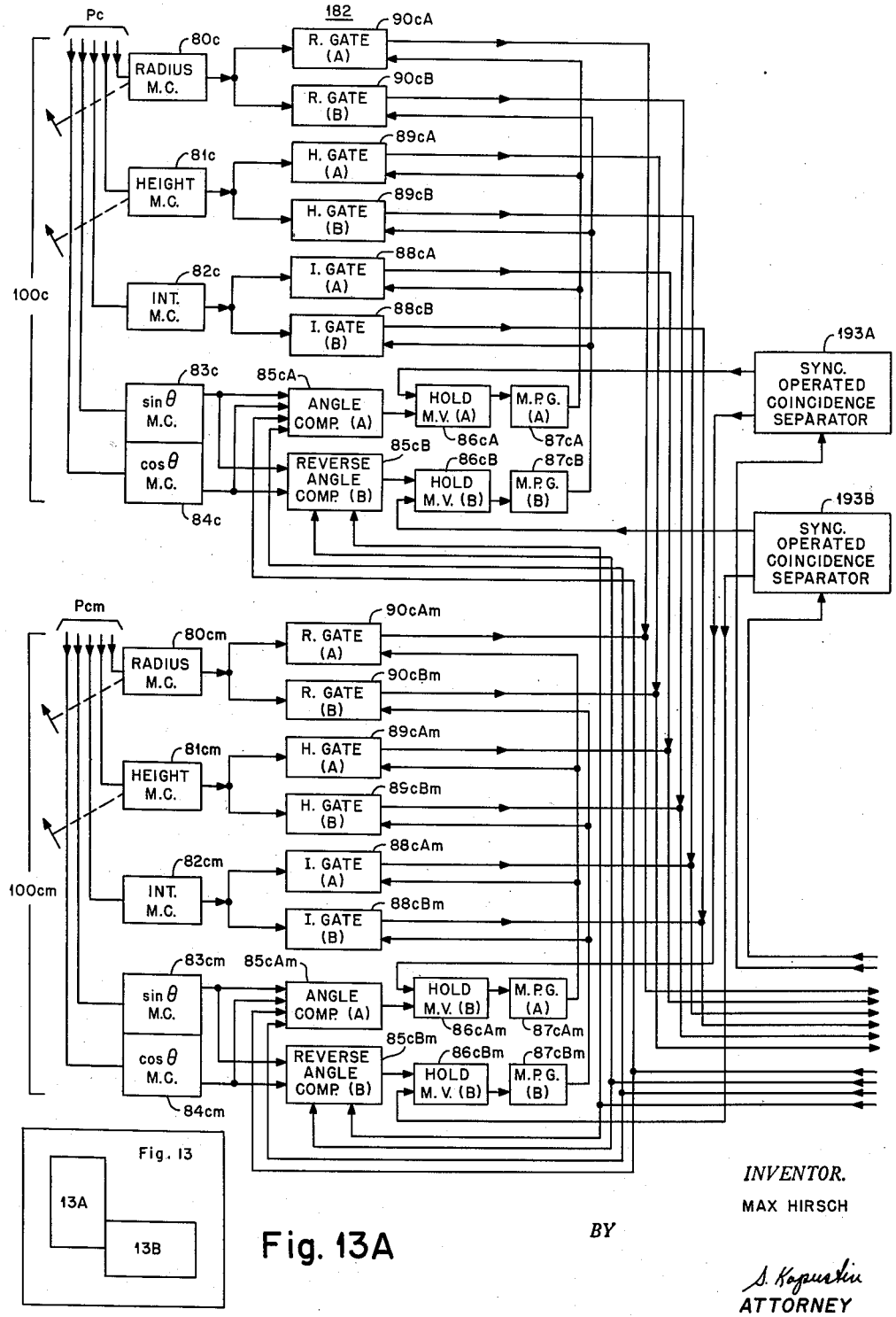

Figs. 13A and 13B a block diagram of circuits used in conjunction with Fig. 7 and Fig. 12. (Fig. 13 illustrates the proper arrangement for Figs. 13A and 13B.)

Figure 14B:
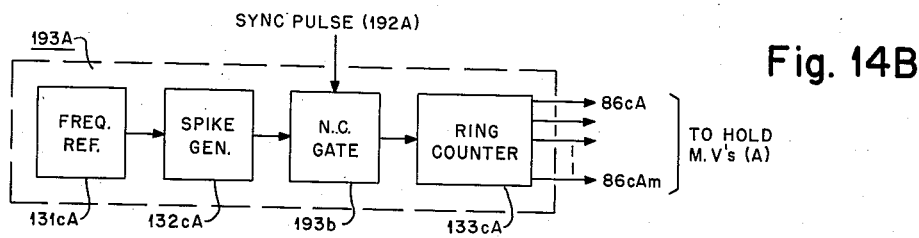
Figure 14A:
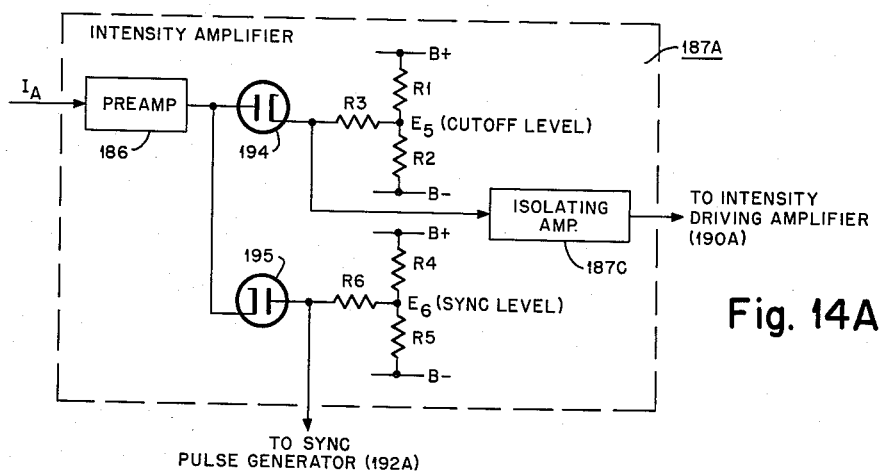

Fig. 14A diagram of intensity amplifier.

Fig. 14B diagram of sync coincidence separator.

Figure 15:
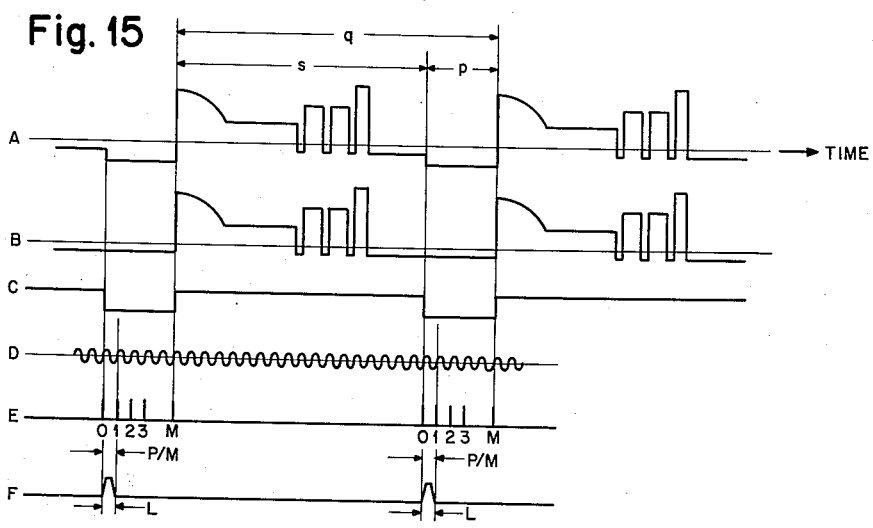

Fig. 15 diagram of timing wave forms.

Figure 16:
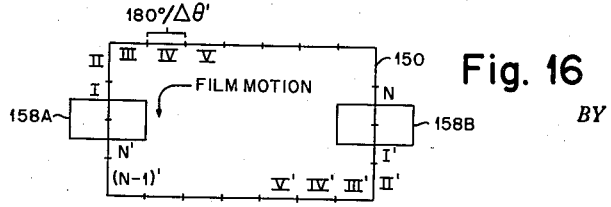

Fig. 16 diagram of loop operation of moving film signal source.

Refer now to Figures 1 and 2, which illustrate a display apparatus (generescope) 50 for presenting a three dimensional image to an observer comprising a cathode ray tube 51, lens 52, mirrors 53, 54, and 55, and a rear projection screen 56, hereinafter designated collectively as optical elements 51–56, arranged such that an image formed on the face of cathode ray tube 51 is projected onto rear projection screen 56. A central ray of light 68 emanating from a central point of the screen 51d of cathode ray tube 51 illustrates the projection. The cathode ray tube 51 is mounted in a hollow tube 65 that is rigidly attached to structure 79 on which are supported the rest of the optical system, elements 52, 53, 54, 55, and 56. Cathode ray tube 51 is held in place within tube 65 by an extended structure 78 that grips the cathode ray tube 51 firmly over a considerable portion of its surface. Surrounding the lower portion of cylindrical container 65 and affixed thereto is a slip ring assembly 58 which connects various electrodes of the cathode ray tube 51 via cable 58b to the several sources of signal driving potentials which operate cathode ray tube 51.

Structure 79 in its upper section consists of a periscope-like arrangement on which mirrors 54 and 55 are mounted. The lower section of structure 79 supports mirror 53 and lens 52 and contains an aperture for the transmission of light from mirror 53 to mirror 54. The rear projection screen 56 is mounted between the two aforementioned sections of structure 79. The tube 65 and the structure 79 are supported by bearing 62, bearing 63 and constrained by bearing 72. The assembly of support structure 79, hollow tube 65, and the optical elements 51–56 rigidly attached therein, are driven by motor 59 via shaft 69a, so that cathode ray tube 51, lens 52, mirrors 53, 54, 55, and screen 56 all rotate in unison, i.e., the aforementioned optical elements 51–56 maintain a fixed spatial relationship with respect to each other. Also driven by motor 59 via shaft 69b are sine and cosine potentiometers 60 and 61 which are connected to a D.C. voltage source (not shown) and produce signal outputs that are the sine and cosine of the angular position of screen 56 at any instant.

The basic supporting structure for the display apparatus 50 is the rigid housing that consists of a long hollow cylinder 66a and shorter, but broader, cylinder 66b, connected by an annular plate 66c. A rigid arm 77 attached to housing 66a has a fixed shaft 71 that fits in a bearing 72. Bearing 72 keeps the rotating assembly of structures 79 and 65 aligned with supporting arm 77 and cylinder 66a. While this rotating system is not symmetrical, it can be balanced by well known methods.

The display chamber 70 containing the rear projection screen 56 is partially enclosed by a transparent cover 57, through which the display on screen 56 can be observed. The broad cylinder 66b and annular ring 66c enclose most of the remaining portion of display chamber 70.

Chamber 70 can be air tight. Thus, lens 52 is sealed within structure 79 and a rotary seal 64 is inserted between support member 79 and structure 66a. Seal 73 which bonds transparent cover 57 to shaft 71 completes the air tight enclosure. Seal 73 also serves an additional function since it acts as a vibration insulator. A pneumatic exhaust pump 67 mounted on arm 77 and coupled to chamber 70 keeps the chamber 70 at reduced air pressure, relieving the screen 56 and the structure 79 of air loading, thereby lowering the drag on motor 79.

Referring now to Fig. 2 in conjunction with Fig. 1, it can be seen that a spot of light produced on the screen 51d of cathode ray tube 51 is projected onto the rear projection screen 56 so that any position of the spot on the screen 51d of the cathode ray tube 51 has a unique corresponding position on the rear projection screen 56 that is not affected by rotation. This is true since all the optical elements 51–56 comprising the display apparatus (generescope) 50 maintain a fixed spatial relationship with respect to each other. When a spot of light shines continuously at a given position on the rear projection screen 56 and that screen is rotated at about 25 cycles per second or more, persistence of vision will give the effect of a continuous circular ring of light whose center is on the axis of rotation of the screen. When the spot is luminous only at a given phase in the cycle of rotation and for a period that is a fraction of the cycle, the circular ring of light reduces to a circular segment whose length may be further reduced so that it effectively constitutes a spot of light in space. The position of the spot of light is uniquely determined by the phase, $\theta'$, in the cycle of rotation of the screen that the spot is luminous and its position on the rear projection screen 56, which may be expressed as $r'$, the radial distance perpendicular to the axis of rotation $(c)$ and $h'$, the distance along the axis of rotation. The coordinates $(r', h', \theta')$ are cylindrical and $(r', h')$ on the rear projection screen are a projection of the usual $(x, y)$ coordinates on the screen 51d of the cathode ray tube 51.

A given spot of light on the screen 51d of cathode ray tube 51, having particular coordinates $(x, y)$ may be projected onto screen 56 so as to have corresponding coordinates $(r', h')$. This spot of light on screen 56 may be seen from a wide angle in front of the screen. When the optical elements 51–56 are rotated 180 degrees, a spot of light may be again projected on screen 56 to have the same coordinates $(r', h')$, if the original spot of light on the screen 51d is electrically displaced so that it now has coordinates $(-x, y)$. This second luminous spot on screen 56 may again be seen over a wide solid angle, but this time from a direction to the rear of the original position of the screen 56. The projected image on screen 56 of a display fixed on the face of cathode ray tube 51 is thus reverted; that is, the horizontal and only the horizontal $(x)$ coordinate of the image is reversed when the screen 56 and all the rest of optical elements 51 to 55 are rotated 180 degrees. The electrical displacement of a spot of light on the screen 51d of cathode ray tube 51 from $(x, y)$ to $(-x, y)$ affects a reversion, so that the coordinates of the displaced spot is $(r', h')$ for both the original position of the screen and its rotated position, 180 degrees removed. The action described for a single point applies to an array of points constituting a two dimensional image. Every two dimensional image is displayed twice in every cycle of rotation, once as a direct image, and the second time as a reverted image, but since each of these images are visible from opposite directions, only one image is visible from a given direction. The total effect is that every position upon which a spot of light may be projected in the volume swept out by the screen 56 may be seen, and consequently the part of the structure 79 that supports mirrors 54 and 55 does not effectively obscure any part of the whole displayed solid image. It may be noted that when the eye of the observer is in the extension of the surface of screen 56, a luminous spot on the screen at that time is not distinctly visible. However, since the observer may employ both eyes and move his head even this restriction may be minimized.

Flash lamp projectors 101 and 101a shown in the upper left section of Fig. 1 are constructed like hand torch projectors used by lecturers discussing a moving picture or stereopticon display wherein an image of an arrow projected on the screen is put at the desired position of the screen by manually directing the hand torch. Flash lamp projectors 101 and 101a may be used in much the same way and for a similar purpose, i.e., to direct attention to some portion of the three dimensional image within display chamber 70. The position of a projected image from projector 101 on screen 56 is determined in part by mechanically directing projector 101 and in part by electrically selecting a given position of the screen 56 upon which the image will be projected. Thus, the projected image is uniquely located within the volume swept out by the screen. Angle control knob 102f on the common shaft of sine and cosine potentiometers 108f and 109f on flash lamp projector 101 may be manually set to select any desired angle, or position of screen 56 by the operation of circuits to be described later. This angle can be read on a bearing scale 101b behind control knob 102f. The action of these circuits is to cause a pulse of electrical energy to be applied to gas glow flash lamp 103 in flash lamp projector 101 whenever screen 56 has a selected angular position so that the image (in this case an arrow) will be flashed as a short pulse of light upon the screen at that time. An adjustable stand 74 is provided so that after a given setting and direction of the flash lamp indicator has been established, it may be maintained without further effort.

A multiplicity of flash lamp projectors 101, 101a, etc. may be employed in parallel (or simultaneously) for a single three dimensional display. Moreover, the flash lamp projectors 101, 101a, etc. are not limited to manual control, as automatic setting and direction systems can be constructed by known art. Furthermore, the projected image need not be an arrow as mentioned above, but may have any desired form, i.e., letters or symbols of any color, which may also be selected by manual or automatic control.

Refer now to Fig. 3 which shows a block diagram of an embodiment of this invention. Display assembly (generescope) 50 and the flash lamp projectors 101, and 101a, etc. the means for displaying images in three dimensions, are shown within a system of circuits. The synchronus sampling circuits 49 comprising several point channels 100, 100a to 100n supply data pulse signals to the driving amplifiers 46 for the display in generescope 50 of a three dimensional array of discrete images that represent discrete points or objects in space. In addition, repetitive circuits 48 supply repetitive signals to driving amplifiers 46 for the display in generescope 50 of images of three dimensional patterns that include lines and surfaces in space. The flash lamp driving circuits 47 help synchronize and power the flash lamp projectors 101, 101a, etc.

The display of positions of discrete points in space, which will now be treated, is related to aircraft control problems, and while the description that follows uses terms associated with aircraft location, the process is general and useful to other fields.

The position of points or aircraft in space may be simulated by various generating means or they may be sensed by radar, radio directing finding, theodolite observation, etc. In any case, the data representing the attributes of a point in space may be presented as height above a given level $(h)$, distance along a given level from a given point $(r)$, and angular bearing $(\theta)$ with respect to some given origin. The three variables $r$, $h$, and $\theta$, or coordinates, uniquely determine the positon of a point in space. A corresponding spot of light of short duration projected onto rotating screen 56 within display chamber 70 of the display assembly 50 shown in Fig. 1 representative of the position of the aforementioned point in space, would have coordinates $(r', h', \theta')$, where $\theta'$ is the angular value of the screen. Accordingly, the bearing angle of the spot of light, and $r'$ and $h'$ are the coordinates in the display chamber 70 corresponding to the spacial coordinates $r$ and $h$ respectively.

A definite law relates each coordinate of the spot of light in the display chamber 70 of the generescope 50 (see Fig. 1) to the coordinates of a corresponding element in space. While linear mapping laws will be used to illustrate this invention, it will be appreciated that logarithmic mapping laws or any other desired transform can be employed. Therefore, by way of example, the following three dimensional mapping laws referring to position may be used; $r'=k_1r$; $h'=k_2h$; $\theta'=k_3\theta$. Here $k_1$ and $k_2$ are mapping constants or mapping scales that need not be equal and $k_3=1$, but may also be some other desired value.

To the three coordinates mentioned, a fourth $(i)$ may be added which identifies the target or indicates the value of some field (or some variable quantity in space) such as potential, temperature, or target size at a given position. According to the mapping law referred to above $i=k_4s$, where $s$ equals the target size. Thus, four variables $(r, h, i, \theta)$ can be presented in the display system. While the description that follows explicitly concerns itself with these four variables, a fifth variable, time is implicitly involved. The displayed discrete spots can move and their motion can be observed; and therefore, the fifth variable time is also displayed. The mapping law $t=t'$ is observed if the original motion and the displayed motion occurs at the same time. For linear mapping in general, $t'=k_5t$. This formula may be mechanized by known art in conjunction with the methods to be disclosed in this invention. For example, if the data concerning the movement of points in space was recorded, the reproduction or "play back" of the data could be made at rates different from that used in recording. The play back rate could be increased or decreased so that $k_5$ may be equal to, less than, or greater than unity, e.g. $1 < k_5 \leq 1$. This would have application in the analysis of aircraft landings and take off. As will be shown the band width of the signals to be recorded are small and well within the means of known recording art.

Before going into a detailed description of Fig. 3, it should be mentioned that several of its block elements are shown in more detail in subsequent drawings. Accordingly, when a particular block (e.g. angle comparator 85) of Fig. 3 is shown in more detail in another diagram (e.g. Fig. 6A) reference should be made to both diagrams (Figs. 3 and Fig. 6A) at the same time.

The synchronous sampling circuits 49, in Fig. 3, require that five sustained data voltages be supplied to each of the point channels 100, 100a, etc. to represent the coordinates of each point or target to be exhibited or other attributes thereof. These sustained voltages are designated as follows:

(1) A voltage (R) on line $a$, proportional to the range of the target.

(2) A voltage (H) on line $b$, proportional to the height of the target.

(3) A voltage (I) on line $c$, proportional to the magnitude or representing the identity of the target. (While only one such voltage is used here, several might be employed for more precise identification.)

(4) A voltage ($E \sin \theta$) on line $d$, proportional to the sine of the bearing angle of the target.

(5) A voltage ($E \cos \theta$) on line $e$, proportional to the cosine of the bearing angle of the target.

The data voltages designated $E \sin \theta$ and $E \cos \theta$ together represent unambiguously the bearing angle of the target.

The five data voltages are sustained, that is, they vary only with attributes of the target they represent. These control voltages can be continuous, or can vary in steps.

Fig. 4, now referred to, shows in block (Fig. 4A), and schematic form (Fig. 4B), a means 110 for producing the five control or data voltages. The radius generator 111, height generator 112, and identification generator 113, are linear potentiometers with D.C. excitation. The bearing generator 76 consists of sine and cosine potentiometers 108 and 109 mounted on a common shaft. The four control knobs 96, 97, 98, and 102, respectively determine the coordinates of a target (R, H, I, $\theta$). These values may also be indicated on scales 96a, 97a, 98a, 102a behind aforementioned knobs 96, 97, 98, and 102. Also these knobs may be adjusted manually to correspond to target data provided by target sensing means or to target data produced synthetically by calculation or trial improvising. Similar sets of voltages may be automatically provided by known electrical methods of converting radar sensing data, i.e., Volscan air traffic control system and from analog simulator outputs.

Referring back to Fig. 3, the five voltages R, H, I, $E \sin \theta$ and $E \cos \theta$ determining the position of a single point or of an aircraft target are transmitted via lines $a$ to $e$ to the radius matching circuit 80, height matching circuit 81, identity matching circuit 82, sine matching circuit 83, and cosine matching circuit 84, respectively, which are part of point channel 100 of synchronous sampling circuits 49. While the following discussion deals with the display of a single point (representative of the position of an aircraft, etc.) by the circuits shown at 100, it will be understood that point channels 100a to 100n operate in a similar manner for other points to be displayed, and may be used to display an N points in space.

Radius matching circuit 80 is connected at its output to the input of both direct and reverse radius gates 90 and 90a. Height matching circuit 81 and identity matching circuit 82 are connected respectively to the inputs of height gate 89 and identity gate 88. Sine and cosine matching circuits 83 and 84 each transmit their sustained sine and cosine voltages to both angle comparators 85 and 85a. These angle comparators each receive another pair of sine and cosine signals from screen angle indicating sine and cosine potentiometers 60 and 61 respectively. When the screen angle is equal, or the reverse screen angle (the screen angle minus 180 degrees) is equal, to the bearing angle of the point, angle comparator 85 or reverse angle comparator 85a respectively is momentarily activated. This action is transmitted to condition the group of gates 88, 89, and 90 or 88, 89, and 90a, respectively as will be shown. Gates 88, 89, 90, and 90a are constructed so as to convert their sustained input voltages into output pulse type signals whose amplitudes are proportional to their sustained input signals. These amplitude modulated signal pulses ultimately are coupled from the outputs of the aforementioned gates to the control grid 51a and deflection elements 51b, 51c respectively of cathode ray tube 51 so that when gates 88, 89, and 90 (or 88, 89, and 90a) are conditioned, the cathode ray tube 51 displays a spot of light that is projected onto screen 56, the position and intensity of which are thus determined by the original sustained voltages (R, H, I, $E \sin \theta$, $E \cos \theta$).

As shall be described, coincidence separator 95 sweeps the point channels 100 to 100n, in conjunction with hold multivibrators 86 to 86n and metering pulsers 87 to 87n. These elements prevent pulse signals from the several point channels 100 to 100n from interfering with each other at the common driving amplifiers 46 when any several points have the same bearing angle.

The effect of any point channel 100 to 100n is to sample three of the sustained data signals synchronously with the movement of the display screen 56. It uses the remaining two sustained data signals (the angle signals) to effect proper synchronism. If the target joint changes so as to change its bearing angle, the corresponding image spot must also change its angle. If this change is fairly large, e.g. 10 or 20 degrees and occurs within the period of a single rotation of the screen, the image spot will not be continuously available to view. There are two solutions to this problem, the rate of rotation of the screen may be increased so that no large change of position occurs within a single cycle, or the data displayed may be limited to slower changes. Slow changes of position imply slow changes of data signals and hence small band widths. These will be "D.C." to low audio. This, of course, applies to the other signals, R, H, and I. The identity signal, I, might also be narrow band, but rapid variation in intensity may be used as an identification code and require somewhat larger band widths. The operation of the circuits of Fig. 3 previously outlined will now be described in more detail.

The radius and height matching circuits 80 and 81, respectively are amplifiers that amplify or attenuate their input voltages depending upon the position of scale select knobs 92 and 93, so as to determine the scale or mapping constants $k_1$ and $k_2$. The scale knobs 92 and 93 operate accurate attenuators (not shown) similar to that used on the input circuits of precision instrument oscilloscopes. By way of example of the operation of scale select knob 93, assume that 20 volts output from the radius matching circuit 80 produces a full scale deflection of the spot of light projected on screen 56, and that this deflection corresponds to 100 miles. Assume further, that the data signal indicative of a target, a hundred miles radial distance is 10 volts. Then it would be appreciated that the scale select knob 93 would be set to amplify by a factor of two. However, if the input for the same object coordinate were 50 volts, then the scale select knob 93 would be set to reduce by a factor of 2/5.

The intensity, $\sin \theta$, nad $\cos \theta$ matching circuits 82, 83 and 84 are of the same construction as the radius or height matching circuits 80 or 81, except that the amplification or attenuation is adjusted for a smaller range by similar adjustment attenuators (not shown). The identification matching circuit 82 is adjusted so that the voltages at the output ultimately determine the brightness of the spot of light on the face of the cathode ray tube 51 by modulating the control grid 51a of the cathode ray tube 51. The sine and cosine matching circuits 83 and 84 are adjusted so that the maximum voltages at their outputs are made equal to the maximum voltages from the screen angle indicating sine potentiometer 60 and cosine potentiometer 61, respectively. The maximum output voltages of matching circuits 83 and 84 shall hereinafter be designated as voltages $E_1$ and $E_3$ respectively, and the maximum voltage from potentiometers 60 and 61 shall be designated as voltages $E_2$ and $E_4$, respectively. Thus, the voltages are adjusted so that $E_1 = E_2$ and $E_3 = E_4$. As previously mentioned, sine and cosine potentiometers 60 and 61 produce voltages which are the sine and cosine of the bearing angle of the screen. It will be appreciated that each potentiometer may be provided with two wiping arms so that two voltages are produced; wherein one voltage is proportional to the given function of the screen 56 bearing angle, and the other voltage is proportional to minus the given function of that angle.

Accordingly, the outputs from elements 60, 61, 83, and 84 shall be referred to as indicated in the following chart:

| Element | Output voltage |
| --- | --- |
| Matching circuit 83 | $E_1$ sine $\theta$ |
| Matching circuit 84 | $E_3$ cos $\theta$ |
| Sine potentiometer 60 | $E_2$ sine $\theta'$; $-E_2$ sine $\theta'$ |
| Cosine potentiometer 61 | $E_4$ cost $\theta'$; $-E_4$ cos $\theta'$ | where $\theta$ = bearing of the target and $\theta'$ = angle of the screen 56.

Four voltages $E_1$ sin $\theta$; $E_2$ sin $\theta'$; $E_3$ cos $\theta$; and $E_4$ cos $\theta'$, the wave forms of which are shown in Figs. 5A and 5B, are fed into angle comparator 85. Fig. 6A illustrates the angle comparator 85 and it operates so as to yield an output pulse when the bearing angle of the target and the angular position of the screen are equal, i.e., when $E_1$ sin $\theta = E_2$ cos $\theta'$, and $E_3$ cos $\theta = E_4$ cos $\theta'$, indicating that $\theta = \theta'$.

The cathode follower buffers 85b and 85c (Fig. 6A) receive the voltages $E_1$ sin $\theta$ and $E_2$ sin $\theta'$ respectively and feed them into sine wave comparator 85f. The buffers 85b and 85c show the same constant output impedance to the sine wave comparator 85f and serve to prevent comparator 85f loading from disturbing the input signals that also go to other circuits. The sine wave comparator 85f is a form of the "Comparators to produce a marker when a sinusoid equals a fixed voltage" (Reference Waveforms, by Chance et al., p. 348 et seq., first ed., 1949). The "sinusoid" is $E_2$ sin $\theta'$ (Fig. 5A) that varies at about 25 cycles per second, and $E_1$ sin $\theta$ (Fig. 5A) is taken as the fixed voltage. This voltage $E_1$ sin $\theta$ is of course not fixed in the absolute sense. It may have all values between $+E_1$ and $-E_1$, and it may vary with time, but its time rate of change as previously described is slow compared to $E_2$ sin $\theta'$. Therefore, it may be taken as a reference or "fixed" voltage. These two voltages, $E_1$ sin $\theta$ and $E_2$ sin $\theta'$, have the same value twice per cycle, e.g., at points $a_0$ and $a_1$ and again at $a_2$, $a_3$ (see Fig. 5a). The sine wave comparator 85 (Fig. 6A) produces a positive marker pulse whenever these two voltages are equal. Fig. 5C shows such markers at $c_0$, $c_1$, $c_2$ and $c_3$. These marker pulses are impressed upon the first control grid 85h of a dual grid control tube 85j, such as the 6AS6, which serves as a coincidence detector.

The cathode follower buffers 85d and 85e (Fig. 6A) function for the voltages $E_3$ cos $\theta$ and $E_4$ cos $\theta'$ in the same manner as buffers 85b and 85c do. The sine wave comparator 85g also functions in the same way as its analog comparator 85f. Thus, when its two voltage inputs are equal, as shown in Fig. 5B at $b_1$ and $b_2$ and again $b_3$ and $b_4$, this comparator 85g also produces positive marker pulses. These are shown at $d_1$, $d_2$, $d_3$ and $d_4$ in Fig. 5D and are impressed upon the second control grid 85i of the coincidence detector, 85j.

When and only when marker pulses from both comparators 85f and 85g are simultaneously impressed upon both control grids 85h and 85i does the coincidence detector 85j conduct and pulses are formed at its output. The detector output pulses at $e_1$ and $e_3$ shown in Fig. 5E indicate coincidence of pulses $c_1$ and $d_1$ along with $c_3$ and $d_3$, respectively. When pulse $c_1$ is produced $E_1$ sin $\theta = E_2$ sin $\theta'$, and when pulse $d_1$ is produced $E_3$ cos $\theta = E_4$ cos $\theta'$. Accordingly, the pulse $e_1$ indicates that the aforementioned two voltages are equal and $\theta = \theta'$. This holds as $E_1 = E_2$ and $E_3 = E_4$ by the adjustment of the sine and cosine matching circuits 83 and 84 respectively, as previously described.

The reverse angle comparator 85a (Fig. 3) has the same physical structure as angle compaartor 85, but operates so as to yield an output pulse when the bearing angle of the target is equal to the reverse angle of the screen, i.e., $\theta = \theta' - 180°$. This holds when $E_1$ sin $\theta = -E_2$ sin $\theta'$ and $E_3$ cos $\theta = -E_4$ cos $\theta'$. The voltages $E_1$ sin $\theta$ and $-E_2$ sin $\theta'$, the wave forms of which are shown in Fig. 5F, are compared within reverse angle comparator 85a to produce marker pulses when they are equal. These marker pulses are also produced as pairs per cycle at $f_1$ and $f_2$, and again at $f_3$ and $f_4$ (see Fig. 5F). The voltages $E_3$ cos $\theta$ and $-E_4$ cos $\theta'$, the wave forms of which are shown in Fig. 5G, are also compared within unit 85a to produce marker pulses when they are equal. These voltages $E_3$ cos $\theta$ and $-E_4$ cos $\theta'$ are equal at $g_1$, $g_2$, $g_3$, and $g_4$. There is coincidence at $f_2$, $g_2$, and $f_4$, $g_4$ to produce coincidence pulses at $h_2$ and $h_4$ respectively as shown in Fig. 5H. The coincidence output pulses $h_2$, $h_4$ occur only when $\theta' = \theta - 180°$, and are the output pulses of reverse angle comparator 85a.

Angle comparator 85 and reverse angle comparator 85a are both connected at their outputs through isolating buffer 86a to an input of hold multivibrator 86 which is a bistable circuit. An output signal from angle comparators 85 or 85a causes the hold multivibrator 86 to change its state from state one to state two. The other input of hold multivibrator 86 is connected to the output of coincidence separator 95 (to be later described in connection with Fig. 6C). Hold multivibrator 86 is caused to change back to its first state by a pulse from separator 95 within such a short period after having received its first pulse from either comparators 85 or 85a that angular definition is not substantially reduced by the movement of screen 56 within that short period, as shall be shown. The output of hold multivibrator 86 is connected to the input of metering pulser 87 which is a monostable multivibrator, so that when hold multivibrator 86 reverts back to its first state, it triggers metering pulser 87, which in turn produces a metering pulse of fixed amplitude and fixed duration. The output of pulser 87 is connected to a second input of the gates 88, 89, 91, and 91a, and consequently each of these aforementioned gates are alerted for a period equal to the duration of the metering pulse. The first inputs to the gates 89 and 88 are, as previously mentioned, connected to the output of height matching circuit 81 and identification matching circuit 82 respectively; and therefore, when intensity gate 88 and height gate 89 receive an activating pulse from metering pulser 87, they produce pulse data signals, the amplitudes of which are proportional to the sustained voltages of their first inputs.

Reference is now made to Fig. 6B in conjunction with Fig. 3 illustrating in more detail the height gate 89, which may be considered typical of the gates 88, 90, 90a. Fundamentally, the height gate includes a dual control electrode tube 89f, such as the 6AS6. The first control grid 89b receives a sustained data signal, here the adjusted height signal from the height matching circuit 81. The second control grid 89e is so biased, that the plate current is cut off. When and only when a positive metering pulse is applied to the second control grid 89e does current pass through to the plate 89d. The first control grid 89b is so biased that the tube 89f may conduct over the entire range of voltages it receives from height matching circuit 81. Since, the amplitude of the positive metering pulse applied to the second control grid 89e is constant, the output pulse amplitude is made proportional to the sustained adjusted input signal. The output signal pulse take off the plate 89d is always negative permitting the isolating diode 89c to act as a switch. When a negative signal pulse is generated at 89d, diode 89c acts as a short and the pulse passes through to the common input of height driving amplifier 105 (Fig. 3).

When, however, no signal pulse is generated and tube 89f is quiescent, diode 89c acts as an open circuit. Consequently, the driving impedance of tube 89f is prevented from loading down any height output pulse signals from other height gates 89 to 89n (Fig. 3), since all the height gates are in parallel. Furthermore, the metering pulse applied to the second control grid 89e has a fixed duration so that the height output pulse also has the same fixed duration.

Referring again to Fig. 3 identity gate 88 is connected at its output via intensifier driving amplifier 106 to the control electrode 51a of cathode ray tube 51. Thus, the signal from gate 88 determines the brightness of the spot produced on the screen 51d of cathode ray tube 51 and consequently on viewing screen 56. Height gate 89 is connected via height deflection driving amplifier 105 to the deflection elements 51c (e.g. vertical deflection plates), of cathode ray tube 51, and hence the signal formed by gate 89 in part determines the position of a spot of light on viewing screen 56. Thus, when $\theta = \theta'$, and again when $\theta = \theta' - 180°$, the angle comparators 85 and 85a respectively trigger the display of a spot image by causing the metering pulser 87 to activate the height gate 89 and the identity gate 88. At both times, the height and intensity are the same and so the same circuits are used, as shown. However, as previously described in the operation of generescope 50, the horizontal position ($r'$) of a given point in the display chamber 70 when $\theta = \theta'$ is reversed or ($-r'$) when $\theta = \theta' - 180°$ if the presentation on the face 51d of cathode ray tube 51 is the same. It is desirable that a given image spot on the screen 56 have the same position in the display chamber 70 at both times. Thus, when $\theta = \theta' - 180°$, the horizontal deflection signal to cathode ray tube 51 must be reversed. This is affected by the circuits next described.

When either of the angle comparators 85 or 85a act, a resulting metering pulse is also impressed (as previously described) upon the second inputs of both of the gates 91 and 91a, the outer gate and reverse outer gate respectively. The first inputs of these gates are connected to the two outputs of ready multivibrator 94, a bistable device. When ready multivibrator 94 is in state one, the first input of outer gate 91 is positive, while the first input of reverse outer gate 91a is negative. Thus, when ready multivibrator 94 is in state one, a metering pulse applied to the second grid of outer gate 91 is transmitted as an output pulse, but the metering pulse applied to reverse outer gate 91a is blocked. When ready multivibrator 94 is in state two, the first input of outer gate 91 is negative while the first input of reverse outer gate 91a is positive. Now, when a metering pulse is applied to both outer gates 91 and 91a, it is blocked at outer gate 91 and transmitted through reverse outer gate 91a. Ready multivibrator 94 has two inputs, one connected to the output of angle comparator 85 and the other to reverse angle comparator 85a. When ready multivibrator 94 receives a pulse from angle comparator 85, it is put into state one, but when it receives a pulse from reverse angle comparator 85a it is put into state two.

A metering pulse transmitted to the second input of outer gate 91 or reverse outer gate 91a is applied to the second input of radius gate 90 or reverse radius gate 90a respectively. These radius gates 90 and 90a are both similar to the height and identity gates 89 and 88. Gates 90 and 90a have impressed on both their first inputs, the sustained data radius signal received from radius matching circuit 80. When either gate 90 or 90a receives a metering pulse at its second input from its respective outer gates, that gate forms a pulse data signal at its output, the amplitude of which is proportional to the sustained radius signal at its input. The pulse signals from gates 90 and 90a are carried to two radius pre-amplifiers 104d and 104r. Reverse pre-amplifier 104r contains one stage (an inverting stage having unity gain) more than direct pre-amplifier 104d. The amplified signals then go into the common deflection driving amplifier 104 whence they are impressed upon deflection electrodes 51b of cathode ray tube 51 through the slip ring assembly 58. Since, a signal from reverse radius gate 90a has been inverted in the reverse radius preamplifier 104r, it will cause a reverse radial (horizontal) deflection on the screen 56, from that caused by a similar signal from radius gate 90. These two signals always occur half a cycle of rotation of screen 56 apart.

Refer now to Fig. 6C in conjunction with Fig. 3. The operation of outer gate 91 and reverse outer gate 91a are fundamentally the same, and the description of one is adequate for the other. The outer gate 91 is in some respects similar to the other gates already described. A dual control electrode tube 91g has impressed on its first control grid 91f one of two possible voltage levels by an output from ready multivibrator 94. On the second control grid 91c there is received the positive metering pulse from pulser 87. When the voltage level on grid 91f is negative, the tube 91g is cut off and a metering pulse applied to its second control grid 91c is blocked. When the voltage level on grid 91f is positive, the tube 91g can conduct. Now, when a metering pulse is applied to the second control grid 91c, it is transmitted to an inverting amplifier 91d. Here it is inverted to a positive metering pulse, and limited by diode 91e to a fixed amplitude, and sent on to gate 90.

To recapitulate, refer again to Fig. 3, when $\theta = \theta'$ a pulse generated at angle comparator 85 triggers hold multivibrator 86 and ready multivibrator 94. Ready multivibrator 94 is put into state one which alerts outer gate 91. The hold multivibrator 86 is soon triggered again by a pulse from coincidence separator 95 and hold multivibrator 86 in turn triggers metering pulser 87. Pulser 87 sends a pulse to identity, height, and outer gates 88, 89, 91, and 91a. The metering pulse is blocked at reverse outer gate 91a, but is transmitted by outer gate 91 to radius gate 90. The gates 88, 89, and 90 convert the sustained signals from matching circuits 82, 81, and 80 into pulse signals. These pulse signals are amplified by amplifiers 106, 105, and 104D with 104, respectively to effect the required spot image on screen 56 by the action of cathode ray tube 51. After the screen 56 rotates 180 degrees more, $\theta = \theta' - 180°$, a pulse is generated by reverse angle comparator 85a. A chain of actions similar to those just described cause this time, the gates 88, 89, and 90a to convert the three sustained signals into pulse signals. These are amplified by amplifiers 106, 105, and 104r with 104 respectively to effect the required spot image on screen 56. Since, the screen has moved 180 degrees, the radial deflection must be reversed. This reversal was affected by reverse pre-amplifier 104r.

As previously stated, the coincidence separator 95 sweeps the point channels 100 to 100n in conjunction with the hold multivibrators 86 to 86n and metering pulsers 87 to 87n. This prevents pulse signals from the several point channels 100 to 100n from interfering with each other at the common driving amplifier 46 when any several points have the same bearing angle. It was also stated that hold multivibrator 86 is caused to change back to its first state by a pulse from coincidence separator 95 within such a short period after having received its first pulse from either angle comparator 85 or 85a that angular definition of the display is not effectively reduced by the movement of screen 56 within that period. The sweeping action of separator 95 consists in repeatedly sending a pulse to each of the hold multivibrators 86 to 86n in temporal sequence; the repetition period of the pulses received by each hold multivibrator 86 from separator 95 must be sufficiently short as compared with the time it takes the screen 56 to sweep an angle corresponding to $\Delta\theta'$, the angular definition.

Now $\theta'=2\pi ft$, where $f$ equals the frequency of the rotation of screen 56; and $\Delta\theta'=$ the angular definition where $\Delta\theta'=2\pi fq$, and $q=$ the period corresponding to the angular definition, i.e., the definition interval. Therefore, if $f=25$ c.p.s. and $\Delta\theta'=1$ degree; $q=\frac{1}{25}\times\frac{1}{360}=111$ microseconds. If there were $n$ point channels whose points could all possibly have the same bearing angle, the signal pulses from the gate circuits 88, 89, 90 or 90a not to interfere with each other should have a duration equal or less than $q/n$. If $n=10$, then $q/n=11.1$ microseconds; or if $n=100$, then $q/n=1.11$ microseconds. The repetitive period of the pulses received by each hold multivibrator 86 from coincidence separator 95 has thus been established as equal to or less than $q/n$.

Referring now to Fig. 6D in conjunction with Fig. 3 it may be seen that coincidence separator 95 comprises a frequency reference 131 which includes a stable oscillator. The frequency of the oscillator is $n/q$, and it transmits its signals to spike generator 132. Spike generator 132 consists of a circuit such as a multiar, that converts its sinusoidal input into a sharp pulse output at a fixed phase of the input. A representation of these spike signals is shown in Fig. 5I. The spike period is of course $q/n$. The spike signals are fed into ring counter 133 that comprises a ring of bistable elements 134 to 134n. All the bistable elements, 134 to 134n receive the spike signals and all the bistable elements except one are in the same state, here called passive or non-conducting. This one exception is in the other state, here called active or conducting. Any element, for example, 134j, changes its state from passive to active only when it receives both a spike signal and a permissor signal from an immediately preceding active element, 134(j–1). This action causes the preceding active element 134(j–1) also to change its state to passive. Thus, only one element is changed to an active state in a cyclic sequence each time a spike pulse is received from spike generator 132. Each of these bistable elements 134 to 134n generates a pulse when it is switched to its active state, which is transmitted to corresponding hold multivibrators 87 to 87n respectively to which elements 134 to 134n are connected. Thus spike numbered 0 triggers element 134, and element 134 in turn sends a pulse to hold multivibrator 87. Then spike numbered 1 triggers element 134a, and element 134a in turn sends a pulse to hold multivibrator in point channel 100a. This proceeds until spike numbered $n$ triggers element 134n whereupon hold multivibrator 87n is sent a pulse. The next pulse is number 0 again and the cycle repeats continuously.

The signal pulses formed by the gates 88, 89, 90 or 90a (Fig. 3) have a duration equal to that of the metering pulse received from metering pulser 87. To prevent interference, the metering pulse duration is made equal to L such that L is equal to or less than $q/n$. This pulse is shown in Fig. 5J. Thus, signal pulses from the gates 88, 89, 90 or 90a also have a duration L, and this is also approximately the period for which electrons in cathode ray tube 51 illuminate the phosphor screen 51d on the face of the tube 51. The period for which light is emitted by cathode ray tube 51 is equal to $L+D$, where D is the decay time of the phosphor (see Fig. 5K). A fast phosphor is used whose decay time D is equal or less than the definition interval less the electron illumination period ($D \leq q-L$).

To avoid jitter of the spot within the definition interval $q$ and thus within the angular definition $\Delta\theta'$, the frequency reference 131 (Fig. 6D) could be synchronized by a sine signal e.g. $E_2 \sin \theta$ from sine potentiometer 60 (Fig. 3).

While the coincidence separator 95 operates on all point channels 100 to 100n in the system of Fig. 3, this is not the only mode of operation possible. Where the data precludes the possibility of some groups of points having the same bearing angle, the coincidence separator 95 may sweep such groups of point channels in parallel.

Repetitive circuits 48 shown in Fig. 3 supply repetitive signals to driving amplifiers 46 for the display in generescope 50 of images of three dimensional patterns that include lines and surfaces in space. The repetitive circuits 48 comprise oscilloscope circuits 107, a series of sync bearing selectors 76s, 76sa, etc., sync angle comparators 85s, 85sa, etc., sync switch assembly 107b, motor speed control 59a and external repetitive signal sources (not shown). The oscilloscope circuits 107 amplify and match signals from external repetitive signal sources (not shown) to the driving amplifiers 46 in conjunction with the synchronous sampling circuits 49 as well as originating its own repetitive signals. The sync bearing selector 76s and sync angle comparator 85s function together to provide synchronizing pulses for synchronizing repetitive signals from either oscilloscope circuits 107 or the external repetitive signal sources (not shown). The motor speed control 59a adjusts the speed of motor 59 of generescope 50, to synchronize the rotation of screen 56 with any external repetitive signal source that is not susceptible to pulse synchronization.

A repetitive signal when displayed on an ordinary cathode ray tube oscilloscope appears as a line pattern when the sweep and the signal are properly synchronized and the sweep has a period that has the same order of duration as the signal. In the three dimensional display of repetitive signals this holds also. If the period of the signal is of the same order of duration as the sweep period T of screen 56 ($T=1/f$, where $f$ equals frequency in cycles per second of the rotation of screen 56) a continuous three dimensional line pattern is displayed. However, here in three dimensions the time base is $\theta'$ and the line pattern has two degrees of freedom, radius ($r'$) and height ($h'$); whereas there is usually only a single degree of freedom in two dimensional oscilloscope displays. When the repetitive signal has a very short repetition period approximately equal to or less than $q$, the definition interval, a trace of a single cycle can be considered a two dimensional line pattern in space. A series of such traces effectively sweeps out a surface or surfaces. Repetitive circuits 48 operating in conjunction with generescope 50 affect such displays and extends the technique of two dimensional oscilloscopy to three dimensions. Moreover, repetitive circuits 48 also operate in conjunction with synchronous sampling circuits 49 to enhance point displays.

The oscilloscope circuits 107 contain apparatus commonly found in general purpose instrument oscilloscopes, e.g., sweep circuits, time marker circuits, calibrating circuits X, Y, Z, internal amplifiers, provision for external output of these amplifiers (here marked Rs, Hs, Is), input attenuators, internal display cathode ray tube 107a, external and internal synchronization, etc. The external outputs of the internal amplifiers of oscilloscope circuits 107, Rs, Hs, and Is, are connected to the radius, height, and intensity driving amplifiers 104, 105, and 106 respectively. Internally, the oscilloscope circuits are so connected that any signal applied to the X, Y, Z amplifiers connected to the internal cathode ray tube 107a, is also transmitted via outputs Rs, Hs, and Is, respectively. The driving impedances of each of the Rs, Hs, and Is, outputs is much greater than the driving impedances of the radius, height, and identity gates 90, 89, 88 respectively when these gates are transmitting a signal to their respective driving amplifiers, 104d, 105 and 106. If the oscilloscope circuits 107 send signals to the driving amplifiers 46 simultaneously with the transmission of signals from any of the point channels 100 to 100n, the Rs, Hs, Is signals will be loaded down to negligible magnitude by the gate output impedances of such a point channel. The pulse signals from these gates 88, 89 and 90 on the other hand see such large impedances in the outputs of oscilloscope circuits 107 that they are virtually unaffected. Consequently the generescope 50 displays the signals from oscilloscope 107 except when signals from synchronous sampling circuits 49 are produced, in which case, spot images are displayed.

The repetitive circuits also include the synchronizing bearing selectors 76s, and 76sa which include potentiometers 108s, 109s, and 108sa, and 109sa, respectively. These bearing selectors 76s and 76sa are a series of pairs of sine and cosine potentiometers mounted on a common shaft, similar in construction and operation to sine and cosine potentiometers 108 and 109 (see Fig. 4A). Sync angle comparators 85s and 85sa are also similar in construction and operation to their homolog angle comparator 85. When an angle, $\theta s$, is set by control knob 102s, a sync pulse is generated by sync angle comparator 85s whenever that angle $\theta s$ is equal to the screen angle, $\theta'$. The sync pulse output can be transmitted through switch assembly 107b to the sync input of oscilloscope circuits 107 where it is employed in a similar fashion to that used in instrument oscilloscopes. The sync pulse can also be fed to the sync inputs of external repetitive signal sources (not shown) to synchronize their outputs and to determine the screen angle for their display or to both oscilloscope 107 and external sources. Other sync bearing selectors 76sa etc. and sync angle comparators 85sa etc. give rise to other sync pulses that can each be timed to any desired screen angle by the setting of its control knob 102sa, etc. These sync pulses also can be fed to either the sync input of the oscilloscope circuits 107 and/or external sources. Switch 107b makes possible the selection of the route of the sync pulses. By the proper setting of switch 107b and jumper 107c connected thereto, a wide variety of sync combinations can be effected. This arrangement makes it possible to apply several sync pulses to a single repetitive signal source. These sync pulses are at defined screen angles and within a given cycle of rotation of screen 56. Such operation may be called $q$ sync, since the signal source has been synchronized not to a cycle of the screen 56 sweep, but to given portions, $q$, of such a cycle.

The motor speed control 59a may be adjusted by knob 59b to alter the speed of motor 59 of generescope 50 to synchronize the rotation of screen 56 with any external repetitive signal source that is not susceptible to pulse synchronization. The lower limit to which the speed may be adjusted is determined by the loss in continuity of the image produced. The upper limit is determined by the mechanical qualities of generescope 50. The electrical circuits 46, 47, 48, and 49 inherently accommodate to display frequency change.

A great variety of signals originating in oscilloscope circuits 107 or passing through circuits 107 can be displayed in generescope 50 in three dimensions. The operations and displays to be described here merely illustrate a wide domain of use. A horizontal reference surface may be generated in generescope 50 by activating a high repetition rate horizontal sweep in oscilloscope circuits 107. These horizontal sweeps are displayed in its internal cathode ray tube 107a as a horizontal $(x)$ line but in the display space of generescope 50, these sweeps are spread out as a horizontal plane. By adjusting the D.C. vertical $(y)$ voltage control of oscilloscope circuits 107, the internal line display may be moved up and down, and the horizontal plane on display in generescope 50 also moves up and down. In addition, a series of step voltages may be applied to the $y$ axis synchronously with the sweep so that now the internal display on scope 107a consists of a series of horizontal lines spaced according to the step voltages. In generescope 50, the display is a series of horizontal planes. Timing markers may be impressed on the horizontal sweeps as pips or vertical deflections in the horizontal traces in the internal display. In the three dimensional display of generescope 50, this gives rise to concentric rings in the stacked horizontal planes.

The sync bearing selectors 76s, and 76sa and sync angle comparators 85s, 85sa, etc. may be used to trigger pulse circuits that feed into the Z axis of oscilloscope circuits 107 and cause periodic intensification of the horizontal sweeps. The variation in intensity of the rapid horizontal sweep traces is not apparent on the internal two dimensional display of cathode ray tube 107a. The repeated traces on cathode ray tube 107a have the same position, furthermore, the response of the eye is so slow it sees them as a single set of horizontal lines of a certain average brightness. In the three dimensional display of generescope 50, the line traces are spread out radially to compose the horizontal surfaces, so that those that are intensified appear as brightened lines upon the surfaces. The bearing selector knobs 102s, 102sa, etc. may be set to desired bearing angles, such as, 0°, 45°, 90°, etc. The brightened lines on the horizontal surfaces in the three dimensional display represent angular reference lines. Thus, a complete cylindrical coordinate system can be displayed, in the image space of generescope 50 that includes the height reference planes, radial reference rings, and angular reference lines. Furthermore, the spot images originating in sampling circuits 49 may also be displayed as to appear concurrently with this coordinate system so that the image spots may be conveniently located.

Other coordinate systems may be displayed in generescope 50 by use of repetitive circuits 48. By way of an example, the generation of a spherical coordinate system is described. High frequency sine and cosine signals are applied to the $x$ and $y$ inputs of oscilloscope circuits 107. This gives rise to a circle on the internal display cathode ray tube 107a. By stepping the amplitudes of the input signals a set of concentric circles are displayed on cathode ray tube 107a. In the three dimensional display this appears as a nest of concentric spheres. Timing markers applied to the circles mark vertical angles on both the two and three dimensional displays. The bearing selector knobs 102s, 102sa, etc. may be set to the desired bearing angles, such as, 0°, 45°, 90°, etc. to trigger very high speed raster scan circuits used as external repetitive signal sources in conjunction with oscilloscope circuits 107. The scan circuits (not shown) are to be operated for single sweep of a field per trigger and to extinguish the sine-cosine signal for the period of that scan. In the generescope 50 display, this appears as vertical surfaces that mark off the selected bearing angles. Thus, a complete spherical coordinate reference system may be displayed and this too may be concurrent with the display of spot images of sampling circuits 49.

The three dimensional display of generescope 50 also receives images from flash lamp projectors 101 and 101a. The flash lamp driving circuits 47 (Fig. 3) help synchronize and power the flash lamp projectors 101 and 101a. As previously stated, the angle control knob 102f on the common shaft of sine and cosine potentiometers 108f and 109f in flash lamp projector 101 may be adjusted to select the desired angle, $\theta_f$, of screen 56 where the projected image of flash lamp 101 will fall. Thus, two voltages $E_f \sin \theta_f$ and $E_p \cos \theta_f$ are sent from potentiometers 108f and 109f respectively to angle comparator 85p. Angle comparator 85p also receives voltages $E_2 \sin \theta'$ and $E_4 \cos \theta'$ from sine and cosine potentiometers 60 and 61 respectively. Comparator 85p operates in the same way as its prototype angle comparator 85 of the synchronous sampling circuits 49. The D.C. excitation (not shown) of potentiometers 108f and 109f is adjusted so that $E_f = E_2$ and $E_p = E_4$. Accordingly, angle comparator 85p produces an output pulse when $E_t \sin \theta_t = E_2 \sin \theta'$, and $E_p \cos \theta_t = E_4 \cos \theta'$, so that $\theta_t = \theta'$. This pulse is transmitted to lamp pulser 99. The lamp pulser 99, which may be a monostable multivibrator, is thereby triggered into generating a pulse of electrical energy of sufficient magnitude and duration to operate flash lamp 103 in projector 101. The pulse of light created projects an image onto screen 56 from projector 101 which is in the angular position selected by knob 102f.

A multiplicity of such flash lamp projectors 101a, etc. may be used with a single screen 56, each with an accompanying channel of driving circuit 47, comprising angle comparator 85pa and lamp pulser 99a. The operation of a multiplicity of flash lamp projectors 101 permits a wider independence than does the multiplicity of spot position channels 100 since a whole given resolution interval, $q$, corresponding to a given display angular definition, $\theta'$, may be used to illuminate each projected flash lamp image no matter the number of those images. Using the illustration previously given for $f=25$ c.p.s., $\theta'=1$ degree, and $q=111$ microseconds, then each projector may have a flash duration, or the image may persist, for an entire 111 microseconds even though several of the images have the same angular value.

The mechanically directed flash lamp projector and rotating screen are but a single embodiment of a general concept and while presented here as an auxiliary means for forming three dimensional images in an integral system, the concept can be employed independently and in other forms, e.g. the display screen could be made visible from both sides, or the screen movement could be linear, etc.

In the second embodiment of this invention shown in Figures 7 to 16, the basic principle of exhibiting a solid image by sequentially displaying sectional images through rotation is again applied. In this second form about to be described, however, the screens of a dual gun cathode ray tube are viewed directly, and consequently, optical projection is obviated. The cathode ray tube and the screens within it are rotated to sweep out three dimensional images. A novel form of cathode ray tube whose features offer important advantages is also employed. Moreover, this second embodiment can display three dimentional scenes the data for which have been recorded on a strip of photographic film. The known variable area method of producing electrical signals from photographic film strip has been used to demonstrate the invention. Other equivalent signal recording and reproducing methods such as variable density photographic film strip, magnetic tape, etc., can also be used. With this recording technique, an electron beam writing method is introduced. Each section of a given scene is formed by simultaneous deflection and intensity signals on the guns of the display cathode ray tube. The electron beam sketches in a way analogous to the sketching of an artist by the movement and pressure of his pencil. This method for writing or directing electron beams may be considered as electronic line sketching.

The synchronous sampling circuits 49 of Fig. 3 in the first embodiment have been modified to operate in the second embodiment. In a similar way, the repetitive circuits 48 as well as the flash lamp projectors 101, 101a, etc. and their flashlamp control circuits 47, of the first embodiment, could be modified to operate with this second embodiment. Conversely, the technique of displaying three dimensional scenes which have been recorded on a photographic film strip of this second embodiment can be modifitd to operate in the first embodiment.

The present embodiment combines the electronic lines sketching technique with a modification of synchronous sampling circuits 49 (Fig. 3) so that both the display of a given volume or scene, and points within the volume may be viewed at the same time. An important application of this second embodiment is the display of terrain features, flight obstacles, and flight aids—such as tethered balloons, flight routes, and glide paths by the electron sketching method together with the display of positions of aircraft, surface vehicles, and other moving objects by the modified synchronous sampling circuits. Other applications of combined displays are readily conceived, such as using the point display as an electronic pointer, for metering means, planetaria, cosmic, atomic, and molecular models, animated cartoons, etc.

Referring now to Fig. 7, there is shown in sectional view ($s$—$t$ of Fig. 8) the direct view display assembly, generescope 114, a portion of the second embodiment of this invention. Generescope 114 comprises a rotatable cathode ray tube 115 which may be viewed directly, thereby eliminating the optical projection system previously disclosed. However, the basic principle of the invention appiles here, in that sequential sections of a volume are presented to direct view on rotating screens $120_A$ and $120_B$ which are part of cathode ray tube 115. The cathode ray tube 115, which will be more fully described in connection with Figs. 8 and 9 is centrally mounted on a support plate 116. A motor 119 is connected by a shaft 118 to the center of support plate 116, and by shaft 118a to sine potentiometer 135, cosine potentiometer 136, and servo generator 137 so that when motor 119 is energized (by means not shown) elements 115, 116, 135, 136, and 137 are caused to rotate together, about an axis of rotation which coincides with the central axis O of the cathode ray tube 115.

The support plate 116 is retained by bearing 129 and the shaft 118 is supported by roll and thrust bearing 130. A small support shaft 131 retained by bearing 132 is attached to support band 127 which girds the exposed surfaces of cathode ray tube 115 and fastens it to support plate 116. Rigid housing 133 provides the basic supporting element to which bearing 129 is attached, and to which bearing 130 is also attached by means of a collar 134. Also supported by housing 133 are motor 119, sine potentiometer 60c, cosine potentiometer 61c, and servo generator 137, as well as a transparent cover 138. This transparent cover 138 together with seal 139, support plate 116, and pad 140, which lies between the bottom surfaces of cathode ray tube 115 and the support plate 116 completely encloses the display chamber 117 or the space in which cathode ray tube 115 rotates. Pad 140 also serves to insulate the cathode ray tube 115 from undue local shock forces. Sleeves 142A and 142B, which are part of the support plate 116, relieve the necks of cathode ray tube 115 of the centripetal force load produced by the rotation.

The various electrodes of electron guns 122A and 122B are connected via lines A through U to the several sections of a slip ring assembly 128. From there, external connections are made to power supply voltages and sources of signal information via lines $A_1$ to $U_1$. Clips 143A and 143B hold plugs 144A and 144B respectively on the electron gun leads firmly for secure electrical contact.

Refer now to Figs. 8 and 9 which show, respectively, a top view and a perspective view of cathode ray tube 115, along with Fig. 7 which shows a sectional view of the cathode ray tube 115 in the direct view generescope 114. It may be observed that cathode ray tube 115 comprises an envelope with transparent walls 124A and 124B, and which has mounted within it a glass plate 126. The glass plate 126 is centrally placed so that the axis of rotation O of the cathode ray tube 115 runs through it, and it is parallel and midway between the walls 124A and 124B. Phosphor screens 120A and 120B are mounted on opposite sides of plate 126 in cathode ray tube 115. Associated with phosphor screens 120A and 120 B are electron guns 122A and 122B respectively, which form part of the cathode ray tube 115 and are symmetrically disposed about the axis of rotation O.

Electron gun 122A forms images on phosphor screen 120A using an iconoscope type electron writing technique in that the gun axis is oblique with respect to the screen. The same holds true for electron gun 122B and its screen 120B. Therefore, phosphor screen 120A and 120B have images formed on their surfaces by electron beams from guns 122A and 122B, respectively. Electron guns 122A and 122B may operate simultaneously so that each forms half of a sectional image displayed in a short time interval allotted to each section. Further, the images produced may be seen from either side of cathode ray tube 115 through the transparent walls 124A and 124B of the tube envelope, and through the transparent plate 126 on which phosphor screens 120A and 120B are mounted.

This direct view generescope 114 exhibits three dimensional images that may be seen from a very wide angle. Each of the sectional images can be seen from either side of the transparent plate 126 that supports the phosphor screens 120A and 120B. When the cathode ray tube 115 is rotated 180 degrees, the same sectional image may be shown again. Thus, in each complete cycle of rotation of the cathode ray tube 115, any sectional image may be shown twice. As previously stated in the disclosure of the first embodiment, each sectional image should be shown about 25 times per second or more for the solid image to appear sustained by the retentivity of the eye. Thus, the cathode ray tube 115 may be rotated at 12.5 cycles per second to show sectional images 25 times per second. This reduction of the rotation by one-half reduces the centripetal force loading by one quarter. Also, the electron beam writing time is increased two fold. In the first embodiment, the display screen would sweep out one degree in 111 microseconds for 25 three dimensional image repetitions per second, whereas now, the same movement (under the same conditions) is made in 222 microseconds. There is time to display twice as much information.

Referring now to Fig. 12 there is shown a film signal source 149 which is an apparatus similar to multichannel magnetic tape reproducers or multichannel sound film reproducers. It, however, produces several electrical signals from a record on a photographic film strip 150, that produce in direct view generescope 114 (of Fig. 7) three dimensional scenes. The moving film signal source 149 may be operated in either of three ways. In the first way, the film 150 moves from the storage reel 153 over roller 149a, through an optical transducer 158A, over a series of rollers 149b to 149i, through another optical transducer 158B, over roller 149j, and finally to take up reel 154. In this case, a temporal sequence of three dimensional scenes will be produced in generescope 114 so that motion may be exhibited. In the second way, a continuous loop of film 150 moves from roller 149a to roller 149j as described in the first way, but continues over rollers 149k to 149p whence it returns to roller 149a to make the loop complete. In this case, a motionless three dimensional scene may be produced in generescope 114. In a third way, a continuous loop of film is again used to produce three dimensional images exhibiting cyclic motion as shall be described below.

The movement of the film strip 150 in any case is driven by all sprocket wheels 151, that engage film 150 for positive linkage at sprocket holes 150a. (Fig. 11B) These sprocket wheels 151 are all linked mechanically to servo motor 152. The film 150 is driven so that its motion is continuous, and closely synchronized with the motion of the screens 120A and 120B of direct view generescope 114 (Fig. 7) since servo generator 137 of generescope 114 is coupled to servo motor 152 and controls it. The optical transducers 158A and 158B transform the data recorded on film 150 into electrical signals that are carried ultimately to the electron guns 122A and 122B, respectively (Fig. 7). A detailed description of the operation of transducers 158A and 158B follows the description of the record on film 150.

Refer now to Fig. 11b. This broad view of film 150 shows that it is divded into three longitudinal tracks, radius track 155, height track 156, and intensity track 157. These three tracks 155, 156, and 157 store respectively, substantially, the range, height, and intensity data for the sections to be displayed. In radius track 155, transverse distance across the clear portion of that track is a measure of the recorded value of the radius data for a section to be displayed. For height track 156, the transverse distance across the clear portion of that track is again a measure of the recorded value of the height data. However, in intensity track 157, only that portion of the transverse distance across the clear portion of that track above cut off level 150b is a measure of the recorded value of the intensity data. Cut off level 150b corresponds to the cut off voltage level of the electron guns 122A and 122B of the direct view generescope 114 (see Fig. 7) so that the recorded value of intensity corresponds to the brightness of the display.

A single transverse line across the film 150, at $Z_1$, intersects the radius track 155, height track 156, intensity track 157, to mark off respectively some given values of radius, height, and intensity, here radius $171p$, height $172p$, and intensity $173p$. The three values determine the three coordinates $(r, h, i)$ of a point P in a display section. That is, any three collinear transverse distances, as previously defined, across the three tracks refer to a common point in a radial display section. The length of film 150 from $Z_0$ to $Z_7$ contains a record of a section of a scene shown in Fig. 11a, to which reference is now made.

It may be seen that radius record 171 when combined with height record 172 trace out the scene 174 shown in Fig. 11A, while the intensity record 173 determines the intensity of that trace. The record from $Z_0$ to $Z_2$ refers to a mountain of the scene, and the record from $Z_2$ to $Z_3$, and $Z_3$ to $Z_4$ refers to two balloons M and Q of the section of the scene. The position of point P on the mountain corresponds to $171p$ and $172p$ on the radius track 155 and height track 156 respectively, and its intensity corresponds to $173p$ on intensity track 157. When there is a discontinuity in the record, as in shifting from the mountain to balloon, and from one balloon to the other, blanking traces 170 are inserted in the intensity record 172 at $Z_2$ and $Z_3$. The effect of these blanking traces 170 is to cut off the electron beam when it moves from one section contour to another.

Not only does the combination of the radius record 171 and height record 172 trace out the section 174, but it traces it at a constant linear speed for a corresponding constant displacement of film 150. This is achieved by making equal lengths of the scene contours correspond to equal lengths along a longitudinal axis of film 150. Radii and heights are laid off on the radius and height tracks 155 and 156 to correspond to the radii and heights of points on section 174 contours at equivalent points along the longitudinal axis of film 150. The intensity track 173 is developed in the same way by laying off intensity amplitudes on track 157 to correspond to the intensity of the points on the contours of section 174. These may be drawn manually by well known drafting methods to produce track records shown at 171, 172, and 173. The drawings may be assembled and photographed to produce the film record 150. The film record 150 may also be produced by semi-automatic or completely automatic techniques.

The brightness of a given sectional display on cathode ray tube 115 (Fig. 7) depends upon the intensity of the electron illumination of each of the image elemental areas of a phosphor screen (e.g. 120A) as well as the duration of the illumination of that area. In order to permit control of the brightness solely by the intensity channel-track 157 of film 150, the technique described above makes for constant linear speed in the displacement of the illuminating electron beams in the display cathode ray tube 115. The duration of the electron illumination of each of the image elements on the phosphor screen is, thus, the same.

It is possible to insert fictitious elements into the scene such as flight paths or glide lines. The spot, S, of Fig. 11A is a sectional view of some such flight path. The records on film 150 between $Z_5$ and $Z_6$, at 171s, 172s, 173s, give the radius, height, and intensity data for that spot. While only one spot corresponding to one flight path is shown, several independent flight paths can be inserted in the record.

The length of film 150 from $Z_7$ to $Z_8$ holds the record for a "sync" trace 168 in intensity track 157. As previously described, the intensity data is measured by the transverse distance of clear film above the cut off level 150b in intensity track 157. When the clear portion of the intensity track 157 is reduced below sync level 169, a sync trace 168, as shown, is established. The sync level 169 corresponds to some convenient voltage level in circuits to be described below. When the sync trace 168 affects a drop in voltage of the intensity signal below this corresponding voltage level, other display circuits to be described later are made operative. Both the radius track 155 and height track 156 have no record from $Z_7$ to $Z_8$ the length of the sync trace 168.

The length of film 150 from $Z_0$ to $Z_7$ is available for the recording of scene elements, real or imaginary, while the length of film from $Z_7$ to $Z_8$ records the sync trace 168. These two lengths of film 150 from $Z_0$ to $Z_7$ and from $Z_7$ to $Z_8$ together make a "field." The film strip 150 as used in moving film source 149 consists of a series of such "fields."

Refer again to Fig. 12 in conjunction with Figs. 10A and 10B. As previously stated, film 150 moves through optical transducer 158A in the moving film source 149 where the data recorded on the film 150 is transformed into electrical signals. In the cross sectional view of optical transducer 158A, it may be seen that light from lamp 161, a constant light source, by passing through lenses 162b and 163b, limited by stops 164 and 165, is brought to a focus at slit 160b in mask 159. It passes through film 150 behind mask 159 to lens 166b which focuses the transmitted light on the photomultiplier tube 167b.

The mask 159 with film 150 behind it is shown isolated in Fig. 10B. The three slits 160a, 160b, 160c in mask 159 are long narrow apertures that lie astride radius track 155, height track 156, and intensity track 157 respectively. They are collinear and traverse the film 150.

There are three single track transducers side by side that comprise optical transducer 158A shown in Fig. 10A. They are marked 143a, 143b, 143c, and transform the recorded data of radius, height, and intensity tracks 155, 156, and 157 respectively into electrical signals, $R_A$, $H_A$, $I_A$ respectively. The path of light to be traced through height track transducer 143b in this view corresponds to the path of light described above in connection with the cross sectional view of optical transducer 158A in Fig. 12. The light from a common, constant, thin tubular light source 161 is brought to a focus by cylindrical lenses 162b and 163b at slit 160b and passes through film 150 at height track 156. The light leaving film 150 passes through cylindrical lens 166b which focuses it on photomultiplier tube 167b. The total luminous flux entering photomultiplier tube 167b is proportional to the clear portion of height track 156 behind slit 160b as is the electrical signal, $H_A$, that the luminous flux generates. Light stops 164 and 165 are common to all three track transducers 143a to 143c and help define and limit the light beam. Partitions 158c and 158d also prevent stray light paths and subsequent cross talk between channels.

The radius and intensity track transducers 143a and 143c operate in the same way. Since the slits 160a, 160b, 160c in mask 159 are collinear, and the clear portions of the three tracks on the same transverse line across film 150 give the values of the coordinates (r, h, i) of a point in a sectional view of the display, then the three electrical signals, $R_A$, $H_A$, $I_A$, respectively generated at the same time also define the point.

The two optical transducers 158A and 158B (Fig. 12) operate in the same way except, as previously stated, they are ultimately coupled to electron guns 122A and 122B respectively of direct view generescope 114 (Fig. 7). The two groups of signals, $R_A$, $H_A$, $I_A$, and $R_B$, $H_B$, $I_B$, of the two transducers 158A and 158B, ultimately generate two sectional views of the display that are 180 degrees apart, and therefore, the length of film 150 between the two transducers 158A and 158B must contain a number of fields equivalent to 180 degrees. The film 150 moves in record source 149 continuously and in close synchronism with the rotary motion of the screens 120A and 120B of direct view generescope 114. Thus, in the time, q, it takes one field of the film 150 to move past some fixed point in record source 149, the screens 120A and 120B move some angular increment, $\Delta\theta'$. This, q, the display period, is the period for the presentation of a single section of the display. Thus $180/\Delta\theta'=$ the number of sectional views displayed by each screen 120A or 120B in half a revolution of those screens. As an illustrative example, if $\Delta\theta'=1$ degree, then there would be 180 fields between the transducers 158A and 158B, whereas if $\Delta\theta'=2$ degrees, then there would be 90 fields between the two transducers. These examples do not define or limit this embodiment of this invention, since changing the mechanical linkage between servo motor 152 and sprocket wheels 151 and/or the length of the fields on film 150, may adjust the angular increments, $\Delta\theta'$, of each sectional display to any desired value.

The angular definition of the three dimensional display is determined by the angular increment $\Delta\theta'$. The period, q, for the display of a single section is related to the angular increment $\Delta\theta'$ so that $q=\Delta\theta'/2\pi f$, where $f=$ frequency of rotation of cathode ray tube 115 in direct view generescope 114. This frequency is about 25 cycles per second or more. Moreover, $q=s+p$ (Fig. 11B or Fig. 15); that is, each sectional display period q has one part, s, used for the display of scene elements using data signals from record source 149, and second part, p, used for the display of discrete spots from synchronous sampling circuits 182 yet to be described which takes place during the sync pulse 168 (see Fig. 11B from $Z_7$ to $Z_8$).

Thus, when moving film, signal source 149 is operated one way with a continuous loop of film 150 as previously described, a motionless three dimensional scene is generated in generescope 114. There are $180/\Delta\theta'$ fields on a length of film 150 between the two transducers 158A and 158B. Since there are at least two such lengths, there are at least $360/\Delta\theta'$ fields in the loop used for the production of a motionless three dimensional scene. Such a length of film that constitutes a series of fields which can produce a single three dimensional image is hereinafter called a "bloc." Furthermore, each three dimensional scene is recorded on $360/\Delta\theta'$ fields, such that for each field there is another field which is $180/\Delta\theta'$ fields removed, that is a recorded complementary field. (A complementary field is displayed simultaneously with an adjacent half section on an adjacent screen, i.e. on screen 120B if the orginal field is displayed on screen 120A.)

When the moving film signal source 149 is operated a second way so that film 150 moves from storage reel 153 through the transducers 158A and 158B to take up reel 154, a temporal sequence of three dimensional scenes will be produced in generescope so that motion may be exhibited. In this case also, $360/\Delta\theta'$ fields or a bloc are required for each three dimensional scene, but each field passes through the transducers 158A and 158B only once.

There is a third mode of operation of source 149 whereby a continuous loop of film 150 may be employed to produce a sequence of three dimensional scenes to exhibit motion or action that is cyclic. The loop of film now contains $(360/\Delta\theta')$ N fields, where N is the number of three dimensional images in the action cycle. A block diagram shown in Fig. 16 illustrates loop operation of moving film signal source 149 that produces cyclic motion in the display of three dimensional scenes. The loop of film 150 is divided into 2 N divisions. Each division has $180/\Delta\theta'$ fields. There are then $(360/\Delta\theta')$ N fields. Division I about to enter transducer 158A has the defined, $180/\Delta\theta'$, number of fields, as does division I' about to enter transducer 158B. Since both division I and I' pass through their transducers at the same time, they contain complementary fields arranged in a mutual sequence. Divisions I and I' constitute a bloc. The remaining divisions II and II', etc., also have complementary fields arranged in a mutual sequence. Thus, the motion of film 150 produces signals for a temporal sequence of three dimensional scenes that can depict motion. If the last three dimensional scene recorded on divisions N and N' exhibited is the immediate predecesser of the scene recorded in divisions I and I', then the motion exhibited is continuous. This mode of operation is useful not only for the exhibition in three dimensions of mechanisms or organisms, i.e., a heart beating, but also for total scenes such as an animal running in place.

Referring now to Fig. 13, there is shown in block form a system for displaying three dimensional images of predetermined scenes concurrently with an array of spots representing discrete points or objects in space. These image spots may enter the scene and move within it. A block representation of the moving film signal source 149 is shown connected by its several outputs to record amplifiers 180. The record amplifiers 180 are connected in turn to driving amplifiers 181, and the driving amplifiers 181 send signals into direct view generescope 114 to affect three dimensional images of scenes recorded in moving film signal source 149. Modified synchronous sampling circuits 182, in the upper half of the block diagram, a variation of the synchronous sampling circuits 49 of Fig. 3 of the first embodiment, also sends its several signals to driving amplifiers 181 and thence to generscope 114. There this second flow of data signals from circuits 182 affects a three dimensional display of spot images as previously disclosed. These discrete spots may move relative to the three dimensional image of a scene produced by signal source 149 in generscope 114.

The operation of both the moving film signal source 149 and direct view generescope 114 have been described. The electrical link, servo generator 137, servo power amplifier 194, and servo motor 152, that synchronizes the two elements (source 149 and generscope 114) is shown.

The radius and height signals $R_A$, $R_B$, $H_A$ and $H_B$ originating as described previously in moving film signal source 149 are fed into radius amplifiers 183A and 183B, and height amplifiers 185A and 185B respectively, where they are amplified. These amplified signals are then fed into radius driving amplifier 188A and 188B and height drving amplifiers 189A and 189B respectively, where they are again amplified. The amplified deflecting signals $R_A$ and $H_A$ are then fed to the deflecting elements of electron gun 122A through slip ring assembly 128, while the amplified signals $R_B$ and $H_B$ are fed through slip ring assembly 128 to the deflecting elements of electron gun 122B. These signals guide the movement of the electron beams of the two guns in the generation of the recorded sectional scenes on screens 120A and 120B, respectively.

The intensity signals $I_A$ and $I_B$ also originate in the moving film record source 149 whence they are fed into intensity amplifiers 187A and 187B respectively.

Referring to Fig. 14A there is shown a basic diagram of intensity amplifier 187A and the description thereof applies to the analog 187B. The intensity signal from source 149 is amplified in preamplifier 186, a conventional linear amplifier. Its output acts on two diode switches 194 and 195. Diode 194 operates with its cathode at voltage $E_5$, a voltage equivalent to the cut off level 150b of the intensity track 157 (Fig. 11B). Diode 195 operates with its anode voltage $E_6$ equivalent to the sync level 169 of intensity track 157. When the amplified intensity signal exceeds $E_5$, that portion greater than $E_5$ passes through diode 194, through isolating amplifier 187c, to the intensity driving amplifier 190A (Fig. 13). This is the signal used to intensity modulate a section display, designated as the intensity modulate signal. Fig. 15A shows a time chart of the original intensity signal and Fig. 15B shows the time chart of the intensity modulate signal and reference is made to these figures in conjunction with Fig. 14. When, however, the amplified original intensity signal from preamplifier 186 is less than $E_5$ then diode 194 acts as an open and no signal passes through it. If the amplified intensity signal becomes less than $E_6$ that portion less than $E_6$ passes through diode 195, but if it is greater than $E_6$ diode 195, acts as an open and no signal passes through. The amplified intensity signal less than $E_6$ is a sync pulse and constitutes the signal equivalent to the sync trace 168 of intensity track 157 (see Fig. 11B). The sync pulse is fed to sync pulse amplifier 192A. Fig. 15c shows a time-voltage chart of the sync pulse signal. This figure shows the portion of the waveform of Fig. 15A which is clipped by diode 195 and represents the output of intensity amplifier 187A to sync amplifier 192A (Fig. 13).

Referring back to Fig. 13, the intensity modulating signals from intensity amplifier 187A and 187B that have been fed into intensity driving amplifiers 190A and 190B respectively are now led through slip ring assembly 128 to the control electrodes of the electron guns 122A and 122B respectively. There they control the brightness in the generation of the recorded sectional scenes.

The sync pulse signals from intensity amplifiers 187A and 187B are fed into sync pulse amplifiers 192A and 192B respectively. There, the sync pulse signals are amplified and fed into the sync operated coincidence separators 193A and 193B respectively, where they serve to render the modified synchronous sampling circuits 182 operative for their duration as shall be described below.

The modified synchronous sampling circuits 182 are a modification of the synchronous sampling circuits 49 of Fig. 3 of the first embodiment. The elements in this Fig. 13 corresponding to elements in Fig. 3 representing the same entity are identified by the same number followed by the letter c. Those elements that operate in conjunction with electron gun 122A have their identification symbols concluded with the letter "A," those that operate with gun 122B have symbols concluded with the letter "B." The modified synchronous sampling circuits 182 comprise M point channels 100c to 100cn. Each of the sampling circuits 100c to 100cn treat the sustained voltage signals of M points $P_C$ to $P_{CM}$ in the same way, so that only the first channel 100c shall be described in detail. The same conventions are used now as for the first embodiment. Thus, $\theta$ refers to the bearing angle of an object point $P_C$ in space while $\theta'$ refers to the angle swept out by screen 120A.

Now, when $\theta = \theta'$, screen 120A of generescope 114 is at $\theta'$ and the image spot is properly presented on that screen 120A. When, however, $\theta = \theta' - 180$, screen 120A is 180 degrees removed from the proper position, but screen 120B is in the correct place. The image spot is now properly presented on 120B. The system of circuits described below operate so that the data pulse signals are switched from electron gun 122A to electron gun 122B when $\theta=\theta'$, changes to $\theta=\theta'$ —180 and the image spot is correspondingly displayed upon first screen 120A and then upon screen 120B.

The five sustained voltages representing point $P_C$ are fed into their five corresponding matching circuits (abbreviated m.c.), radius m.c. 80c, height m.c. 81c, identity m.c. 82c, sin $\theta$ m.c. 83, and cos $\theta$ mc. 84c. The sin $\theta$ and sin $\theta$ matching circuits 83c and 84c outputs are each fed into both the angle comparator 85cA and the reverse angle comparator 85cB. The screen angle indicating sine and cosine potentiometer 60c and 61c mounted on generscope 114 function in the same way as their analogs of Fig. 3. They send voltages $E_2$ sin $\theta'$, and $E_4$ cos $\theta'$ to angle comparator 85ca and voltages $-E_2$ sin $\theta'$, and $-E_4$ cos $\theta'$ to reverse angle comparator 85cb. Thus, angle comparator 85cA has the following inputs: $E_1$ sin $\theta$, $E_2$ sin $\theta'$, $E_3$ cos $\theta$, and $E_4$ cos $\theta'$; and reverse angle comparator has the following inputs: $E_1$ sin $\theta$, $-E_2$ sin $\theta'$, $E_3$ cos $\theta$, and $-E_4$ cos $\theta'$. When, and only when, $\theta=\theta'$ does angle comparator 85cA, transmit a pulse to hold multivibrator 86cA, and when, and only when, $\theta=\theta'$ —180 does reverse angle comparator 85cB transmit a pulse to hold multivibrator 86cB. The functions and the operations of the two angle comparators 85cA and 85cB are the same as for their analogs in the first embodiment.

As stated above, when $\theta=\theta'$, the point is properly displayed on screen 120A. Thus, when $\theta=\theta'$, angle comparator 85cA sends a pulse to hold multivibrator 86cA, which causes it to flip to its second stable state. The sync operated coincidence separator 193A to be described more fully below sends another pulse, a short time later so as to cause no apparent angular error, to hold multivibrator 86cA. This causes hold multivibrator 86cA to change back to its first stable state and trigger metering pulser 87cA. Metering pulser 87cA now sends its pulse of fixed amplitude and duration to the second control grid of each of the three "A" gates, intensity gate 88cA, height gate 89cA, and radius gate 90cA rendering each of the aforementioned gates operative for a period equal to the metering pulse. Now, the radius, height, and intensity gates 90cA, 89cA, 88cA have impressed on their first control grids the adjusted sustained signal outputs of radius, height, and intensity matching circuits 80c, 81c, 82c respectively. Thus, sampling data pulses are formed at the operative gates whose amplitude are proprotional to their corresponding sustained input signals. These sampling pulses are received and amplified by the radius, height, and intensity "A" driving amplifiers 188a, 189a, and 190a respectively. The amplified sampling data pulses are conducted on to the deflecting electrodes and control grid of electron gun 122A through slip ring assembly 128. Thus, point $P_C$ is properly represented on screen 120A.

When, however, $\theta=\theta'$—180, the point is properly represented on screen 120B. Now, when $\theta=\theta'$—180, the reverse angle comparator 85cB sends a pulse to hold multivibrator 86cb, which causes it to flip to its second stable state. The sync operated coincidence separator 193B sends another pulse, also at so short a time later as to cause no apparent angular error in the display, to hold multivibrator 86cB. The pulse from separator 193B causes hold multivibrator 86cB to change back to its first stable state and trigger metering pulse generator 87cB. Metering pulse generator 87cB now sends another pulse of fixed amplitude and duration to the second control grids of each of the three "B" gates, intensity gate (B)88cB, height gate (B)89cB, radius gate (B)90cB rendering each of the aforementioned gates operative for the duration of the metering pulse. The radius, height, and intensity gates 90cB, 89cB, and 88cB, also have impressed on their first control grids, the outputs of the radius, height, and intensity matching circuits 80c, 81c, and 82c, respectively. Thus, sampling data pulses are transmitted through these operative gates whose amplitudes are proportional to their corresponding sustained input signals. These sampling data pulses are received and amplified by the radius, height, and intensity "B" driving amplifiers, 188B, 189B, 190B respectively. The amplified sampling data pulses are sent to the deflecting electrodes and control grid of electron gun 122B through slip ring assembly 128. Thus, the point $P_c$ is again properly represented, but now on screen 120B.

To recapitulate, the sustained data signals of the first three matching circuits 80c, 81c, 82c, are converted to sampled pulse signals by the "A" gates 90cA, 89cA, 88cA, when $\theta=\theta'$. The sampled pulse signals from gates 88cA, 89cA, and 90cA are then amplified by the "A" driving amplifiers at 181 and applied to electron gun 122A of generescope 114 to form a spot image on screen 120A. When $\theta=\theta'$—180, the same sustained data signals are converted to sampled pulse signals by the "B" gates 90cB, 89cB, 88cB. After being amplified by the "B" driving amplifiers at 181, the sampled pulse signals are applied to electron gun 122B to form a spot image on screen 120B. This process is repeated for other points $P_c$ to $P_{cm}$ in the other point presentation channels $100_c$ to $100_{cm}$ in the same way. As in the first embodiment, the provision taken to avoid malfunction when two or more points might possibly have the same angular bearing is to effectively sweep the channels $100_c$ to $100_{cm}$. That is, the sync operated coincidence separator 193A sends a pulse to each of the hold multivibrators 86cA, 86cA', to 86cAm respectively. These pulses are spaced by a time interval equal to or slightly greater than the duration of the metering pulser 87cA, etc. output pulses so that sampling pulse signals from the several point channels 100c, etc. cannot be formed at the same time, or coincide, and thus cannot interfere with each other. The sync coincidence separator 193B operates in the modified synchronous sampling circuits 182 in the same way for its parallel "B" branch of circuits, i.e. to control metering pulsers 87cB etc. via hold multivibrators 86cB etc.

The sync coincidence separator 193A not only switches the several point channels 100c to 100cm in temporal sequence but it performs the action only while the sync pulse from sync pulse amplifier 192A is impressed on its input. During that time, there are no other signals from signal source 149 to interfere with signals from the "A" branch of the modified synchronous circuits 182. On the other hand when the signals flow from source 149, the "A" branch of the circuits 182 are made inoperative and therefore the signals from circuits 182 cannot interfere with signals from source 149. Again, the sync coincidence separator 193B operates in the same way to keep the signals of "B" branch of the modified synchronous sampling circuits 182 from interfering with the "B" branch of source 149. Moreover, the "A" and "B" branches of synchronous sampling circuits 182 do not operate at the same time since $\theta=\theta'$ and $\theta=\theta'$—180° cannot occur simultaneously.

Refer now to Fig. 14B in conjunction with Fig. 13. The sync coincidence separator (A)193A is very similar to its analog coincidence separator 95 of the first embodiment (Fig. 6D) except that a gate 193b has been added. The gate 193b between a spike generator 131cA and a ring counter 133cA is normally closed or inhibited. No spike pulse from spike generator 132cA may normally pass through gate 193b. When the sync pulse from sync pulse amplifier 192A is applied to gate 193b, it opens and becomes a permissor. Spike pulses may now pass through to the ring counter 133cA where they are distributed so that one pulse passes to each of the "A" hold multivibrators 86cA, etc., during the sync pulse.

The waveform shown in Fig. 15D represents the sinusoidal output of the frequency reference 131cA. A spike pulse is formed in spike generator 132cA for every cycle of the output from frequency reference 131cA. Only those concurrent with the sync pulse shown in Fig. 15C pass through gate 193b as shown in Fig. 15E. The period of these spikes is $p/M$, where $p$ is the duration of the sync pulse and $M$ is the number of point channels $100c$ in the system. As previously described, $p$ is that portion of the section display period, $q$, allotted for the presentation of spot images. Each of the spike pulses 0, 1, 2, to M, is sent to one of the hold multivibrators $86ca$ to $86cm$ by ring counter $134ca$. Fig. 15F shows a metering pulse sent from any metering pulse generator $87ca$, etc. to its gates; its duration, L, being equal to or slightly less than $p/M$.

Having thus described my invention, I claim:

1. Apparatus for the exhibition of three dimensional images comprising an information means for forming data signals, a rotatable screen for sweeping out a volume adapted to have its axis of rotation substantially parallel to its surface and light generating means responsive to said data signals coupled to said information means for repetitively converting said data signals received from said information means into points of light on said rotating screen at any angular position of said screen, said screen being further adapted to rotate at a rate sufficient to exhibit persisting images in said volume.

2. The apparatus defined in claim 1 wherein said axis of rotation lies in the surface of said screen.

3. An apparatus defined in claim 1 further including an airtight chamber comprising a transparent cover enclosing said screen.

4. The apparatus defined in claim 3 further including means for maintaining the gas pressure within said chamber at a reduced value.

5. Apparatus for the exhibition of three dimensional images comprising information means for forming data signals, a rotatable viewing screen for sweeping out a volume adapted to have its axis of rotation substantially parallel to its surface, signal responsive means coupled to said information means for converting said data signals into points of light on said screen, and means for synchronizing the formation of said points of light with selected angular positions of said screen.

6. The apparatus defined in claim 5 further comprising a screen position indicating means coupled to said screen and said synchronizing means for controlling said synchronizing means.

7. An apparatus for exhibiting three dimensional images in a volume including a rotatable viewing screen for sweeping out said volume, said screen being adapted to have its axis of rotation substantially parallel to its surface, and image producing means for recurrently producing spots of light on said screen at any angular position of said screen, said screen being further adapted to rotate at a rate to form apparently persisting three dimensional images by said spots of light in said volume.

8. An apparatus according to claim 7 wherein said image producing means includes a cathode ray tube for forming spots of light, and an optical projection and reflection means interposed between said cathode ray tube and said screen for projecting spots of light formed by said cathode ray tube upon said viewing screen; and wherein said apparatus further includes means for supporting and rotating in unison said viewing screen, projection and reflection means, and said cathode ray tube.

9. An apparatus according to claim 7 wherein said image producing means includes at least one selectively operable optical image projector for producing images on said viewing screen, fixed support means for supporting said projector, means for directing and sustaining the direction of said projector in relation to said screen at selected angular positions thereof, and means coupled to said projector for recurrently rendering said projector operable at said selected angular positions of said viewing screen, whereby the location of the projected image in said volume is determined.

10. An apparatus according to claim 7 further comprising input means coupled to said image producing means for applying data signals determinative of the attributes of said spots of light, and data means for forming said signals coupled to said input means.

11. An apparatus according to claim 10 wherein the data means comprises a plurality of sets of potentiometers, each said set for forming a set of temporally sustained electrical signals that are functions of independent variables of the attributes of a spot of light.

12. An apparatus according to claim 10 wherein said input means comprises at least a set of circuit means coupled to said data means, said circuit means selectively amplifying or attenuating in varying degrees the signals applied thereto in accordance with the characteristic law of said circuit means to produce an output signal wherein the degree of amplification of said circuit means determines a scale of an attribute of a spot of light in said volume and the characteristic law determines the nature of the relation of the data signal to the attribute of a spot of light.

13. An apparatus according to claim 10 wherein said data means produces time varying signals for varying the attributes of said spots of light whereby said three dimensional images exhibit motion.

14. An apparatus according to claim 10 wherein said image producing means is adapted to rotate in unison with said screen, said input means includes reversion means for applying said data signals to said image producing means when said screen is at a selected first angle and a second angle increased 180 degrees therefrom, and for inverting a portion of said data signals determinative of those attributes that are distances of spots of light from said axis of rotation when said screen is at said second angle to revert said second image whereby the images on said screen at said first and second angles thereof have the same orientation in said volume.

15. An apparatus according to claim 10 further including a screen angle sensing means coupled to said viewing screen for forming signals representative of angular positions of the screen, and wherein said data means forms a plurality of sets of signals, each set comprising at least an electrical signal that is a function of an angular coordinate of a spot of light; said input means comprises a plurality of comparison means, each said comparison means being connected to receive screen angle signals from said sensing means and electrical signals corresponding to the angular coordinate of a spot of light from said data means for producing an output when the signals representative of the screen angle and the signal that is a function of the angular coordinate of spot of light are equal.

16. An apparatus according to claim 15 wherein said angle sensing means has first and second outputs, said first output being representative of said screen angle and said second output being representative of said screen angle plus 180 degrees, and each said comparison means comprises a first and second comparator, said first and second outputs of said angle sensing means being connected to each of said first and second comparators respectively, each said paired comparators being further connected to receive said electrical signals corresponding to the angular coordinate attribute of a spot of light from said data forming means, said first comparator of the pair producing an output signal when the signals corresponding to the screen angle and spot angular coordinate are equal and said second comparator of the pair producing an output signal when the signals corresponding to the screen angle and spot angular coordinate are 180 degrees apart.

17. An apparatus according to claim 15 wherein said data means comprises a plurality of sets of analog memory devices, and wherein said input means comprises a plurality of sets of sampling circuits, each set of memory devices being coupled to an associated set of sampling circuits and to an input of an associated comparison means, said comparison means being coupled at its output to said associated set of sampling circuits, wherein each comparison means actuates its associated sampling circuits into forming a set of simultaneous pulsed signal outputs corresponding to a set of sustained signal inputs applied to said sampling circuits, when the angle of said viewing screen and the angular coordinate attribute of a spot of light bear a predetermined relation to each other.

18. An apparatus according to claim 17 wherein said input means includes an anticoincidence means coupled to said plurality of sets of sampling circuits, said anticoincidence means producing a periodic train of permissor pulses for alerting each of said sets of sampling circuits in temporal sequence and for delaying the actuation of each set of sampling circuits by its associated comparator for a time which is a fraction of said train period whereby only one set of pulse signals are applied from said sampling circuits to said image producing means at a time.

19. An apparatus according to claim 17 wherein said data means further comprises a set of electrical signal generators for producing signals, the instantaneous values of which are determinative of spots of light in said volume, at least one of said generators producing repetitive signals the amplitude of which varies with time for a period related to the period of screen rotation, and the values of which are determinative of lines of light, and said input means further comprising a link for coupling the signals of said sampling circuits and said signal generators to said image producing means, said link comprising a suppressing means for selecting signals from said sampling circuits and rejecting signals from said generators when said signals are coincident.

20. An apparatus according to claim 10 wherein said data means comprises a set of electrical signal generators for producing signals, the instantaneous values of which are determinative of spots of light within said volume, and at least one of said generators produces repetitive signals, the amplitude of which varies with time for a period related to the period of screen rotation, and the values of which determine lines of light whereby signal outputs from said generators determine a variety of images in three dimensions.

21. An apparatus according to claim 14 further including a motor connected to rotate said screen and speed control apparatus coupled to said motor for selectively controlling the rate of screen rotation whereby said screen rotation is synchronized with said repetitive signals.

22. An apparatus according to claim 14 wherein said generators are selectively operable and further including synchronizing means coupled to said screen and to said generators for actuating said generators simultaneously and substantially synchronously with a selected angular position of said screen.

23. An apparatus according to claim 20 wherein said generators are selectively operable and further including synchronizing means coupled to said screen and to said generators for actuating said generators simultaneously and substantially synchronously with a plurality of selected angular positions of said screen in each cycle of screen rotation.

24. An apparatus for exhibiting three dimensional images comprising a rotatable viewing screen for sweeping out a volume, said screen being adapted to have its axis of rotation substantially parallel to its surface, an image forming and projecting means comprising a plurality of selectively operable optical image projectors for producing images on said screen, fixed support means for supporting said projectors, and a plurality of means coupled to said projectors for recurrently rendering said projectors operable at a plurality of selected angular positions of said viewing screen.

25. Apparatus for exhibiting three dimensional images in a volume comprising a viewing screen adapted to effectively sweep out said volume through cyclic motion, image producing means for producing spots of light on said screen at a rate to form apparently persisting images in said volume, said image producing means comprising a plurality of selectively operable image projectors for projecting images on said viewing screen, fixed support means for supporting said projectors, means for directing and sustaining the direction of each said projector in relation to said screen at selected positions thereof, and means coupled to each projector for rendering each of said projectors operable at a selected position of said viewing screen.

26. Apparatus for exhibiting three dimensional images in a volume comprising a viewing screen adapted to effectively sweep out said volume through cyclic motion, image producing means responsive to signals for producing spots of light on said screen at a rate to form apparently persisting images in said volume; input means coupled to said image producing means for applying data signals determinative of the attributes of said spots of light, and data means for forming said signals coupled to said input means; said data means comprising a plurality of sets of electrical analog memory elements, each said set forming a set of temporally sustained electrical signals that are functions of the attributes of a spot of light, whereby the location of said spots of light with respect to three orthogonal coordinates in said volume and other attributes of said spots of light are determined.

27 Apparatus according to claim 26 wherein each said element comprises a potentiometer.

28. Apparatus for exhibiting three dimensional images in a volume comprising a viewing screen adapted to effectively sweep out said volume through cyclic motion, image producing means responsive to signals for producing spots of light on said screen at a rate to form apparently persisting images in said volume; input means coupled to said image producing means for applying data signals determinative of the attributes of said spots of light, and data means for forming said signals coupled to said input means, said input means comprising at least one set of circuit means coupled to said data means, each member of said set of circuit means amplifying or attenuating in selectively varying degree the signals applied thereto in accordance with the characteristic law of each member of said set of circuit means to produce an output signal wherein the degree of amplification or attenuation determines a scale for the exhibition of an attribute of a spot of light in said volume and the characteristic law determines the nature of the relation of the data signal to the attribute of a spot of light.

29. Apparatus for the exhibition of three d'mensional images in a volume comprising a viewing screen adapted to effectively sweep out said volume through cyclic motion, screen position sensing means coupled to said viewing screen for forming signals representative of positions of the screen, image producing means responsive to data signals for producing spots of light on said screen at a rate to form apparently persisting images in said volume; input means coupled to said image producing means for applying data signals determinative of the attributes of said spots of light, and data means for forming said data signals coupled to said input means, said data means forming a plurality of data sets of signals, each set comprising at least one electrical signal that is a function of a positional coordinate of said spot of light; said input means comprising a plurality of comparators, each said comparator connected to receive screen position signals from said sensing means and said electrical signals corresponding to the positional coordinate of a spot of light from said data means for producing an output when said screen position and said positional coordinate have a predetermined relation.

30. Apparatus for the exhibition of three dimensional images in a volume comprising a viewing screen adapted to effectively sweep out said volume through cyclic motion, image producing means responsive to signals for producing spots of light on said screen at a rate to form apparently persisting images in said volume, input means coupled to said image producing means for applying data signals determinative of the attributes of said spots of light and data means for forming said signals coupled to said input means, wherein said data means comprises a plurality of sets of analog memory devices, each set of devices forming temporally sustained electrical signals which are functions of the attributes of a spot of light in said volume including signals which are functions of positional coordinates, and said input means comprises a plurality of sets of sampling circuits and a plurality of comparators, each set of memory devices being coupled to an associated set of sampling circuits and to an input of an associated comparator, said comparator being coupled at its output to said associated set of sampling circuits, each comparator actuating its associated sampling circuits into forming a set of simultaneous pulsed signal outputs corresponding to a set of sustained signal inputs applied to said sampling circuits, when the signals corresponding to the position of said viewing screen and a positional coordinate of a spot of light bear a predetermined relationship.

31. An apparatus according to claim 30 wherein said data means further comprises a set of electrical signal generators for producing signals, the instantaneous values of which are determinative of spots of light in said volume, at least one of said generators producing repetitive signals the amplitude of which varies with time for a period related to the period of screen motion and the values of which are determinative of lines of light, and said input means further comprises a link for coupling the signals of said sampling circuits and said signal generators to said image producing means, said link comprising a suppressing means for transmitting signals from said sampling circuits and rejecting signals from said generators when said signals are coincident.

32. An apparatus according to claim 30 wherein said input means includes an anticoincidence means coupled to said plurality of sets of sampling circuits, said anticoincidence means producing a periodic train of pulses for alerting each of said sets of sampling circuits in temporal sequence and for delaying the actuation of each set of sampling circuits by its associated comparator for a time which is a fraction of said train period whereby only one set of pulse signals are applied from said sampling circuits to said image producing means at a time.

33. Apparatus for exhibiting three dimensional images in a volume comprising a viewing screen adapted to effectively sweep out said volume through cyclic motion, image producing means comprising a cathode ray tube for producing spots of light on said screen at a rate to form apparently persisting images in said volume; input means coupled to said cathode ray tube for applying data signals determinative of the attributes of said spots of light, and data means for forming said signals coupled to said input means comprising a set of electrical signal sources for producing signals the instantaneous values of which are determinative of spots of light in said volume, wherein at least one of said sources produces repetitive signals the amplitude of which varies with time for a period related to the period of screen motion for deflecting said spots of light directly to and only to a selected series of positions upon said screen whereby said apparatus forms three dimensional images that are oscillographic representations of said signals.

34. An apparatus defined in claim 33 further including means coupled to said screen and said sources for substantially synchronizing the signals from said sources simultaneously with a selected position of said screen.

35. An apparatus according to claim 33 wherein said sources are selectively operable and further including synchronizing means coupled to said screen and to said generators for selectively actuating said sources simultaneously and substantially synchronously with a plurality of selected positions of said screen in each cycle of screen motions.

36. The apparatus defined in claim 23 further comprising means coupled to said display screen for controlling the period of cyclic motion of said screen for synchronizing the screen motion with the signals from said source.

37. An apparatus for exhibiting three dimensional images in a volume comprising a rotatable light source for forming two dimensional images, a rotatable approximately flat screen for sweeping out a solid volume through revolution and for receiving and displaying said two dimensional images from said light source, a rotatable image transfer means interposed between said screen and said light source for transferring said images from said light source to said screen, and driving means coupled to said screen, said light source and said transfer means for rotating said source, said screen, and said means in unison.

38. Apparatus for exhibiting three dimensional images in a volume comprising a viewing screen adapted to effectively sweep out said volume through cyclic motion, cathode ray tube means having deflection means for producing spots of light on said screen at a rate to form apparently persisting images in said volume, and information signal sources coupled to said deflection means for controlling the location of spots of light by non scanning direct deflection signals.

39. The apparatus as defined in claim 38 wherein said sources produce time varying signals for varying the location of spots of light in the volume swept by said screen whereby said spots of light appear to move in said volume.

40. Apparatus for exhibiting three dimensional images in a volume comprising an electro-optical image forming means having an image forming surface for exhibiting spots of light and for exhibiting two dimensional scenes in response to signals applied thereto, said surface being adapted to sweep out said volume through cyclic motion, a signal source having a movable record bearing medium containing recorded data defining a plurality of sections of three dimensional scenes and objects, a transducer coupled to said image forming means and associated with said record bearing medium for converting said data thereon into electrical signals, and selectively operable input means coupled to said image forming means for applying signals thereto determinative of the attributes of said spots of light.

41. The apparatus as defined in claim 40 wherein said medium has recorded thereon periodic synchronizing data and includes sensing means associated with said transducer and coupled to said input means for detecting said synchronizing data and for producing a signal in response thereto which renders said input means operative.

42. An apparatus for the exhibiting of three dimensional images in a volume including a rotatable electro-optical image forming means having a light generating surface for exhibiting two dimensional images in response to signals, said surface sweeping out said volume and adapted to have its axis of rotation parallel to itself, said volume being swept out by said surface at a rate to form apparently persisting three dimensional images from said two dimensional images.

43. An apparatus according to claim 42 further comprising a signal source having a movable record bearing medium containing recorded data defining three dimensional scenes, a transducer for converting said recorded data into electrical signals, means for moving said record bearing medium by said transducers in synchronism with the rotation of the surface of said image forming means, and means coupling the signals from said transducer to said image forming means, whereby said recorded data defining said three dimensional scenes, are converted into three dimensional images in the volume swept out by said surface.

44. An apparatus according to claim 43 wherein said record bearing medium is a film strip which comprises a set of longitudinal channels, each channel having recorded thereon data defining an attribute of elemental spots of light of said two dimensional images.

45. An apparatus according to claim 44 wherein said transducer comprises a set of member transducers, and each member transducer includes a sensing element in association with one of said channels for converting data recorded thereon into electrical signals.

46. The apparatus defined in claim 42 wherein the electro-optical image forming means comprises a cathode ray tube having an electron sensitive screen corresponding to said surface.

47. The apparatus defined in claim 46 wherein said cathode ray tube comprises an envelope having a transparent portion encasing both sides of said screen whereby said screen is viewable from a large solid angle.

48. The apparatus defined in claim 46 wherein said cathode ray tube comprises a plurality of electron guns and a plurality of electron sensitive screens, each of said guns being associated with one of said screens.

49. An apparatus according to claim 46 further comprising a moving film signal source for forming signals having a strip of film containing recorded data defining three dimensional scenes, a transducer for converting said recorded data into electrical signals, means for moving said film strip past said transducer in synchronism with the rotation of said cathode ray tube, and means coupling the signals from said transducer to said cathode ray tube, whereby said recorded data defining three dimensional scenes, are converted into three dimensional images in the volume swept by said screen.

50. An apparatus according to claim 49 wherein said strip of film comprises a set of longitudinal channels, each channel having recorded thereon data defining an attribute of elemental spots of light of said two dimensional images, transverse sections of said film intersecting said set of channels containing data defining said elemental spots of light, and wherein the relative positions of said transverse sections on a length of said film strip containing data for a three dimensional image define the relative angular positions of said elemental spots of light around the axis of rotation of said screen.

51. An apparatus according to claim 50 wherein said transducer comprises a set of member transducers, each member transducer having a sensing portion astride a channel for converting said recorded data in said channel into corresponding electrical signals, the sensing portions of said members being positioned to cover a transverse section of said film, whereby the instantaneous values of the set of signals from said set of member transducers define elemental spots of light corresponding to recorded data as said film moves by said transducer.

52. An apparatus according to claim 51 wherein said cathode ray tube has two electron guns, each said gun being adapted to form spots of light on substantially different portions of said electron-sensitive screen, said portions being positioned on opposite sides of said axis of rotation; said moving film signal source has two transducers, the transverse sensing sections of each of said transducers being separated along the film strip by a length equivalent to 180 degrees of rotation; and means coupling the signals from each of said transducers to one of each said electron guns.

53. An apparatus according to claim 50 wherein a selected one of said channels has data recorded thereon defining the attribute of brightness of said elemental spots of light in analog form, said brightness record being a function of the recorded signal within prescribed limits, recorded data on said selected channel transcending one of said limits being a record of synchronizing signals whereby said channel records both brightness and synchronizing information.

54. An apparatus for the exhibition of three dimensional images in a volume including a viewing screen adapted to effectively sweep out said volume through cyclic motion, image producing means for producing in response to data signals spots of light on said screen at a rate to form apparently persisting images in said volume, a record bearing medium comprising a set of parallel record bearing channels, each channel having recorded thereon along a same selected dimension thereof data defining an attribute of elemental spots of said image wherein displacements along said selected dimension of said medium correspond to displacements of said screen, transducing means associated with said channels and having relative motion therewith along said selected dimension for converting said recorded data from said channels into electrical signals, means for synchronizing said relative motion with said screen motion and means for coupling said electrical signals from said transducing means to said image producing means, whereby the temporal sequence of concurrent electrical signals from said transducing means determines a temporal sequence of elemental spot images on said screen.

55. The apparatus defined in 54 wherein said transducing means comprises a plurality of transducing members, each member being positioned astride one of said channels for converting recorded data from its associated channel into electrical signals.

56. The apparatus defined in claim 54 wherein said record bearing medium is a film strip containing said set of parallel record bearing channels along the length dimension thereof.

57. The apparatus defined in claim 54 wherein the value of the recorded data on a preselected one of said channels defining an attribute of said elemental spots of light has at least one preset limit, recorded data having values transcending said preset limit being a record of synchronizing signals and means associated with said transducer for detecting when an electrical signal is produced by said transducer in response to data having a value transcending said limit.

58. An apparatus according to claim 54 wherein said set of channels comprising the recording medium has data recorded thereon defining one three dimensional image, and further comprising means for recurrently causing said recording medium to have relative motion with respect to said transducing means, said transducing means recurrently converts said recorded data into electrical signals whereby said viewing screen displays a fixed three dimensional image.

59. An apparatus according to claim 54 wherein said set of channels is divided into a series of sections, each section having data recorded thereon defining a three dimensional image, and further comprising means for recurrently causing said recording medium to have relative motion with respect to said transducing means, said transducing means recurrently converting said recorded data into electrical signals whereby said viewing screen recurrently displays a series of three dimensional images.

60. An apparatus according to claim 56 further comprising a supply reel of said film strip and a take up reel for said film strip and means for moving said film strip from said supply reel past said transducer to said take up reel wherein said film strip is divided in a series of longitudinal sections, each section having recorded thereon data defining a three dimensional image, and said transducing means converts the data recorded thereon into electrical signals whereby said screen displays three dimensional images exhibiting motion.

61. An apparatus according to claim 54 wherein said set of channels comprises first and second deflection channels and one intensity channel, said first deflection channel containing data determining the position of said spots of light along one frame of reference on the surface of said screen, said second deflection channel containing data determining the position of said spot of light along a second frame of reference on the surface of said screen, said intensity channel containing data determining the intensity of spots of light on said screen, and concurrent electrical signals converted from said data recorded on said first and second channels and said intensity channel by said transducer determine the position and intensity, respectively, of spots of light on said screen.

62. Apparatus defined in claim 54 wherein the data contained in a preselected displacement of said set of recording channels along said selected dimension comprises a frame of data and corresponds to a preselected displacement of said screen, said data in a frame is converted by said transducing means and said image producing means into elemental spots of light on said screen to form a discrete two dimensional image in the volume swept out by said preselected displacement of said screen and said record bearing medium comprises a series of said frames, the sequential conversion of the data on said frames by said transducing means and said image producing means producing a series of two dimensional images serially displaced in said volume to form therein three dimensional images.

References Cited in the file of this patent

UNITED STATES PATENTS

| | | |
|---|---|---|
| 2,538,800 | Ranger | Jan. 23, 1951 |
| 2,604,607 | Howell | July 22, 1952 |
| 2,806,216 | Fryklund | Sept. 10, 1957 |